Figure 1:
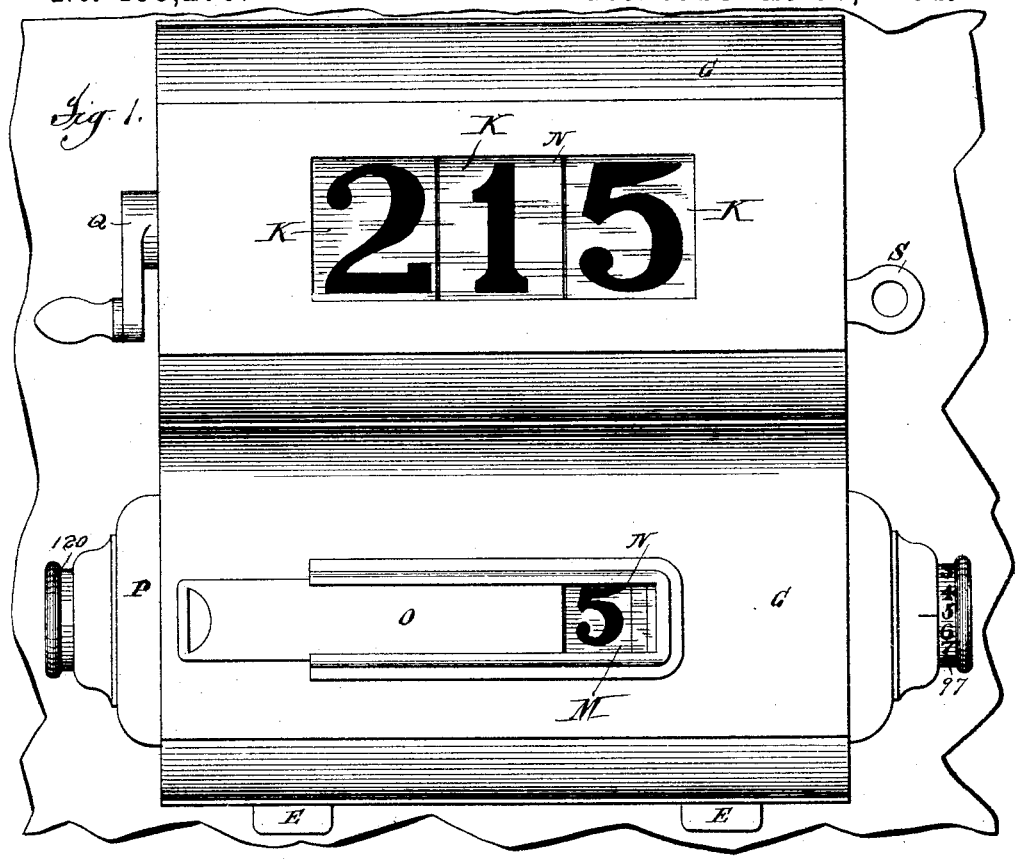

(No Model.) 14 Sheets—Sheet 1.

J. T. COWLEY.
FARE REGISTER.

No. 455,276. Patented June 30, 1891.

Attest:
Geo. H. Botts
J. Kennedy

Inventor:
James T. Cowley
By Philipp Phelps Horey
Attys (No Model.)

14 Sheets—Sheet 2.

J. T. COWLEY.
FARE REGISTER.

No. 455,276.  Patented June 30, 1891.

Attest
Geo. H. Lotts
J. J. Kennedy

Inventor
James T. Cowley
By Philip H. Phelps
+ Hovey
Attys (No Model.) 14 Sheets—Sheet 3.
J. T. COWLEY.
FARE REGISTER.
No. 455,276. Patented June 30, 1891.
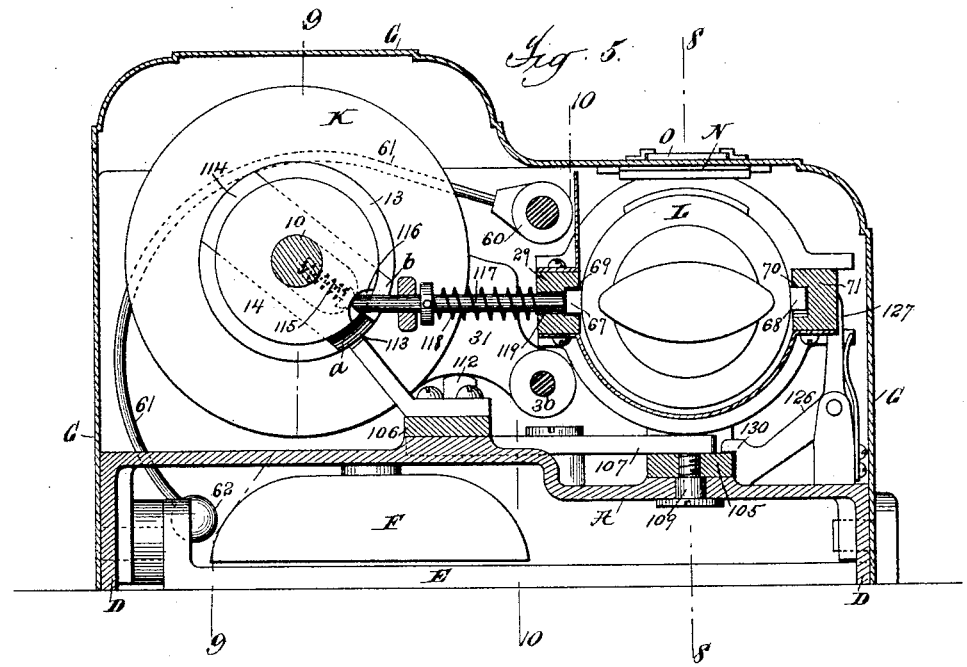
Attest:
Geo. H. Bott.
J. J. Kennedy
Inventor
James T. Cowley
By Philipp, Phelps & Hovey
Attys.

(No Model.) 14 Sheets—Sheet 4.

J. T. COWLEY.
FARE REGISTER.

No. 455,276. Patented June 30, 1891.

Attest:
Geo. H. Potts.
J. J. Kennedy.

Inventor:
James T. Cowley
By Philipp Phelps & Hoory
Attys (No Model.) 14 Sheets—Sheet 5.

J. T. COWLEY.
FARE REGISTER.

No. 455,276. Patented June 30, 1891.

Attest:
Geo. H. Potts
J. J. Kennedy

Inventor:
James T. Cowley
By Philipp Phelps Honey
Attys

THE NORRIS PETERS CO., PHOTO-LITHO., WASHINGTON, D. C.

(No Model.) 14 Sheets—Sheet 6.

J. T. COWLEY.
FARE REGISTER.

No. 455,276. Patented June 30, 1891.

Attest:
Geo. H. Bell
J. Kennedy

Inventor
James T. Cowley
By Phelps & Honey
Attys (No Model.) 14 Sheets—Sheet 7.
J. T. COWLEY.
FARE REGISTER.

No. 455,276. Patented June 30, 1891.

(No Model.) 14 Sheets—Sheet 8.
J. T. COWLEY.
FARE REGISTER.
No. 455,276. Patented June 30, 1891.
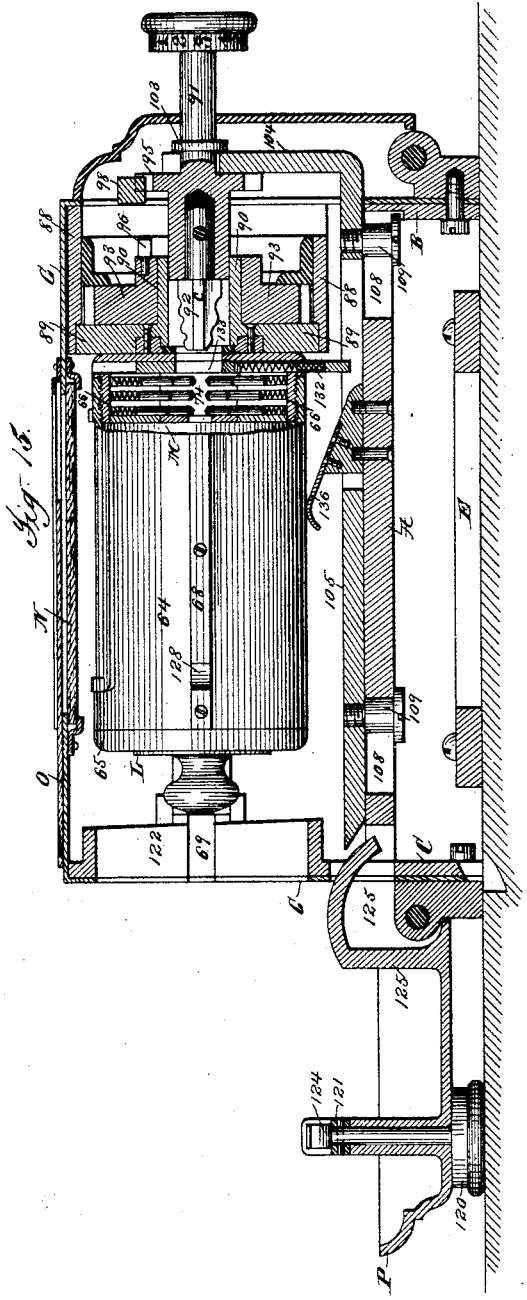
Attest:
Geo H Bott
J Kennedy
Inventor:
James T. Cowley
By Philipp Phelps & Honey
Attys

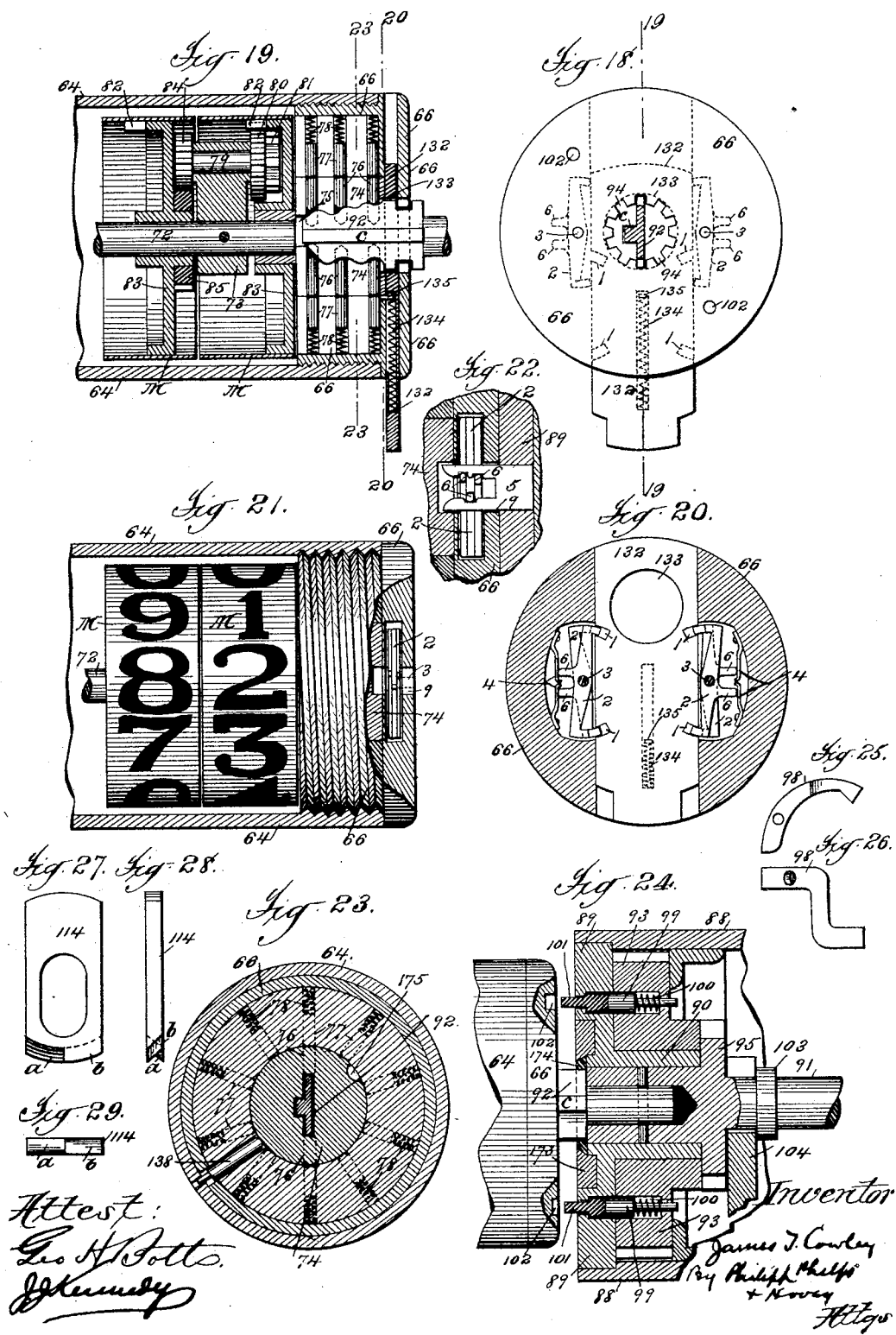

(No Model.) 14 Sheets—Sheet 10.
J. T. COWLEY.
FARE REGISTER.
No. 455,276. Patented June 30, 1891.
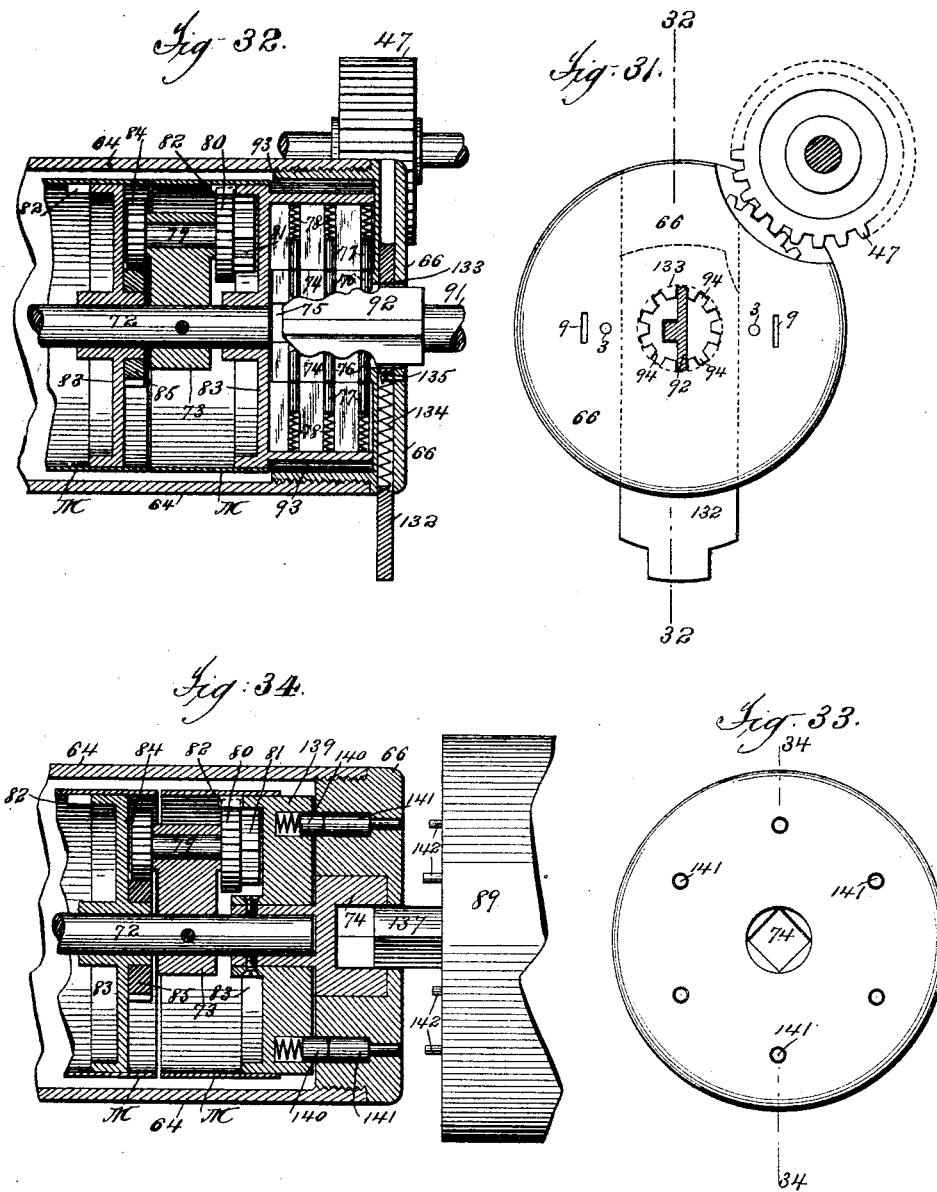

(No Model.) 14 Sheets—Sheet 11.

J. T. COWLEY.
FARE REGISTER.

No. 455,276. Patented June 30, 1891.

Attest:
Geo. H. Potts.
J. J. Kennedy

Inventor:
James T. Cowley
By Philipp Philpp & Hoorg
Attys

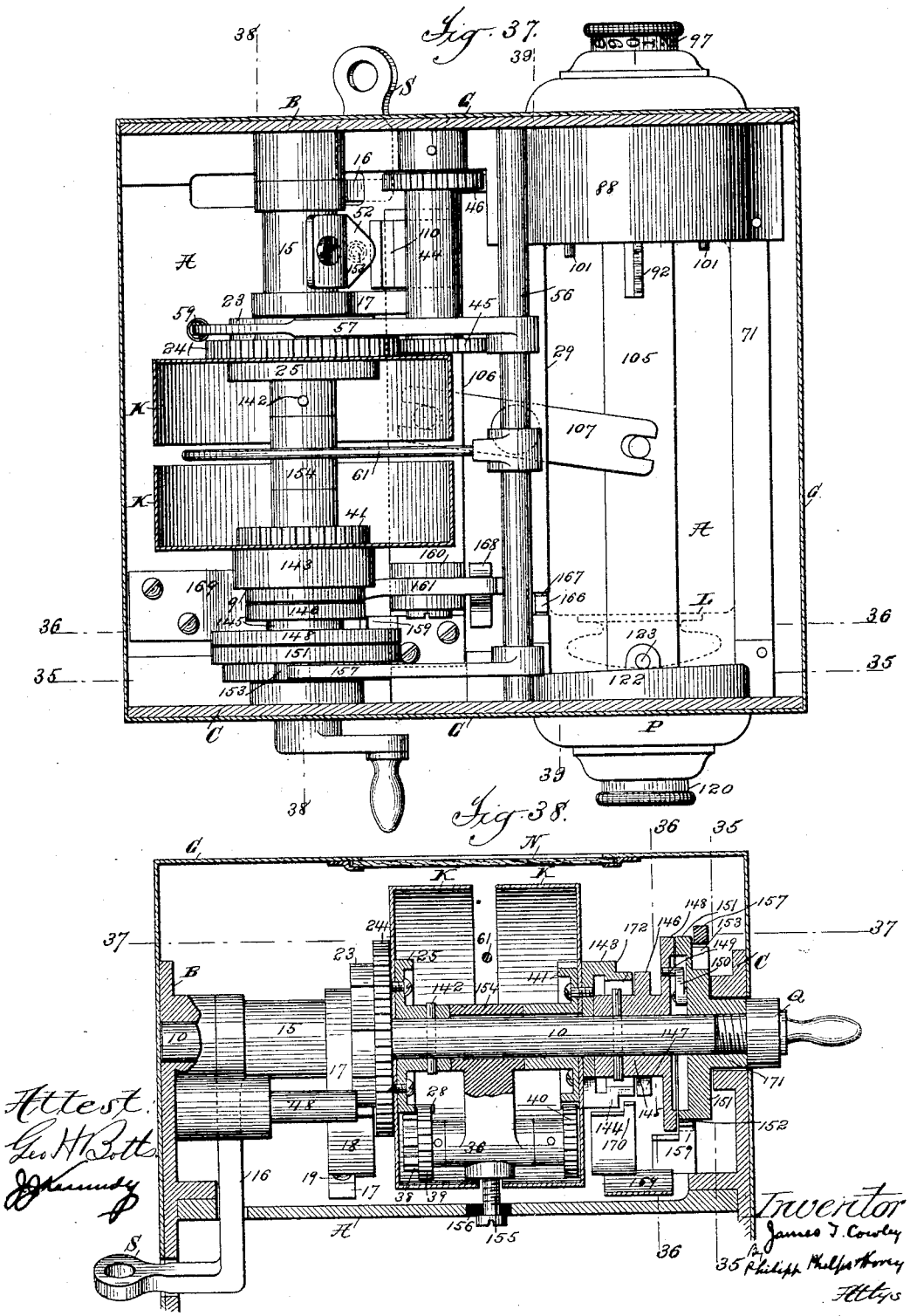

(No Model.)  14 Sheets—Sheet 13.

J. T. COWLEY.
FARE REGISTER.

No. 455,276.  Patented June 30, 1891.

Attest
Geo. H. Botts.
J. J. Kennedy

Inventor
James T. Cowley
By Phelps
Phelps, Attorney

THE NORRIS PETERS CO., PHOTO-LITHO., WASHINGTON, D. C.

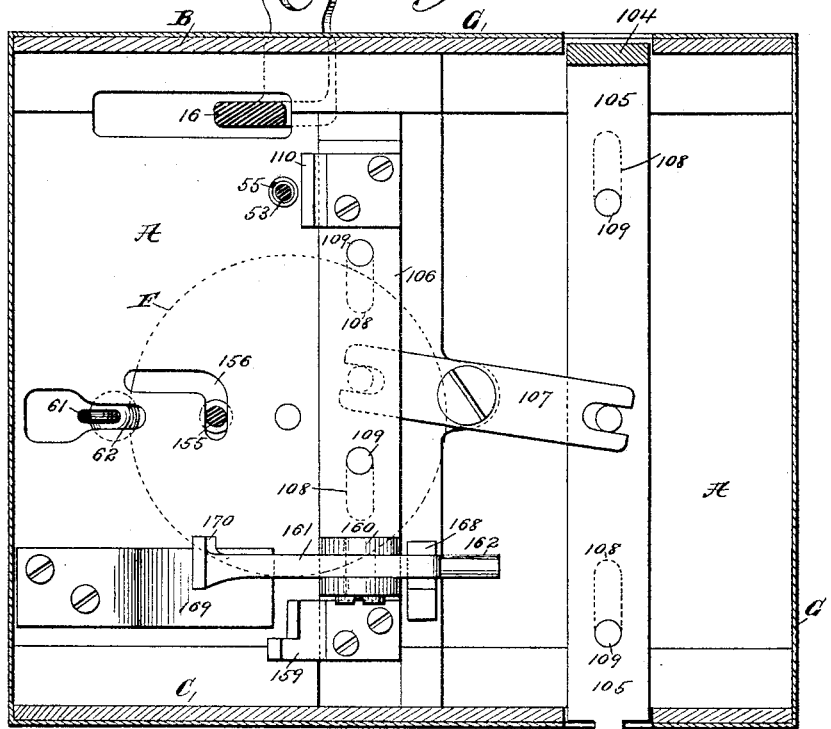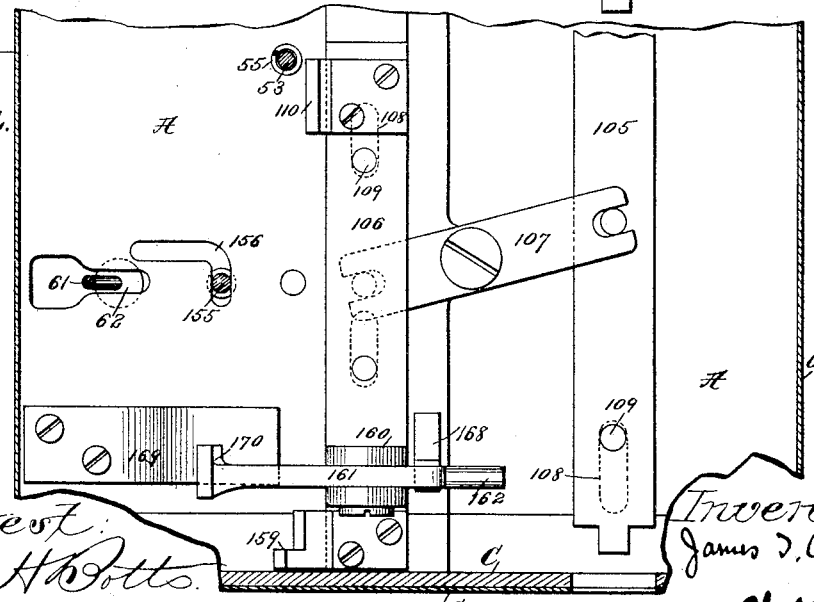

UNITED STATES PATENT OFFICE.

JAMES T. COWLEY, OF LOWELL, ASSIGNOR TO OAKES A. AMES, OF EASTON, MASSACHUSETTS.

FARE-REGISTER.

SPECIFICATION forming part of Letters Patent No. 455,276, dated June 30, 1891.

Application filed August 12, 1890. Serial No. 361,802. (No model.)

*To all whom it may concern:*

Be it known that I, JAMES T. COWLEY, a citizen of the United States, residing at Lowell, county of Middlesex, and State of Massachusetts, have invented certain new and useful Improvements in Registers, fully described and represented in the following specification and the accompanying drawings, forming a part of the same.

This invention relates especially to fare-registers, its general object being to provide a register of this class which shall afford greater security against fraud than those heretofore in use, and which shall at the same time be simple, compact, and convenient of operation.

In order to render the detailed description hereinafter given more easily understood, a brief description of the system in which my fare-register is to be used and the general features of its construction will first be given. In fare-registration by street-car and other companies a trip-register and general register operating simultaneously have been used, both registers being secured in the fare-register and the latter either permanently attached to the car in which it is used or made detachable therefrom, so that the entire register may be carried by the conductor to the inspector's office for record, the trip-register being returned to zero for each trip of the car, but the general register continuing its registration for the day or any other period of time desired. These fare-registers are used continuously in the same car, and various devices are found to be necessary in order to prevent fraud by the change of the registering mechanism, so that either the general register or both of the registers shall fail to register or shall register incorrectly. I obtain greater security against fraud by employing in connection with the trip-register a removable general register, the general registers being made interchangeable, so that any general register may be used with any of the trip-registers upon the line. In this system the conductors will receive different general registers upon different days, and also will preferably be assigned to different cars, so that no opportunity will be offered a conductor to interfere with the mechanism of either the trip or general register without detection, and any fraudulent change shall avail the conductor only during the day on which it is made. By this system, also, the conductors may be changed from car to car, as desired, without breaking the conductor's record for the day, this being independent of any car to which he may be assigned, as the general register goes with him from one car to another. The general registers will be assigned the different conductors each morning or at such other time as is desired, each conductor being charged with his general register by number and with the number of fares which are then registered upon it, if any, and this general register will accompany the conductor throughout the day and be turned in at night for record. The fare-register may either be locked against the removal of the general register by any one except the general inspector, who will visit the car for this purpose, or the fare-register may be open to the conductor and the general register removed and taken to the inspector's office at the end of the day for examination and record. In either case all the general registers come under the inspector's eye at the end of each day.

In order to prevent fraud, it is evidently necessary that means should be provided for locking the trip-register when the general register is removed or disconnected, so as to prevent the conductor from ringing up fares upon the trip-register while the general register is either removed from the machine or disconnected from the trip-register. It is necessary, also, that the trip-register shall always be at zero upon the introduction of the general register, in order that the number of fares rung up during the trip shall always agree with the reading of the trip-register and the number of passengers, and for this purpose means are provided for returning the trip-register mechanism to zero and for locking the same, so that the general register can be removed or introduced only when the trip-register is at zero. I provide, also, means whereby, when the trip-register and general register are once disconnected for the purpose of returning the trip-register to zero, it is impossible for the registering operation to be resumed when the trip-register is only partially returned, thus insuring a full return to zero. When the general register is disconnected from the trip-register or removed, it must be impossible for the conductor to operate the general-register disks and change the registration, and means are provided whereby the general-register disks are locked and the casing of the general register is secured against removal by any one not provided with the proper unlocking means.

For controlling the connections between the trip-register and general register and locking and unlocking the various parts of the machine, I employ, preferably, a form of the well-known "pin-lock," and I provide means for concealing the key and key-hole from examination by the conductor, thus preventing him from copying these parts.

My invention consists generally, therefore, in various constructions embodying a removable register and locking devices for the register and the machine or a permanent co-acting register, and, further, in various locking devices for the trip and general registers and other parts of a fare-register or other registering-machine, whether employing the removable register feature or not, and in various specific constructions and combinations of parts of general application in registering-machines, all of which will be particularly described in the following specification, and pointed out in the claims.

A detailed description of a fare-register embodying my invention will now be given, reference being had to the accompanying drawings, forming a part of this specification, in which—

Figure 2:
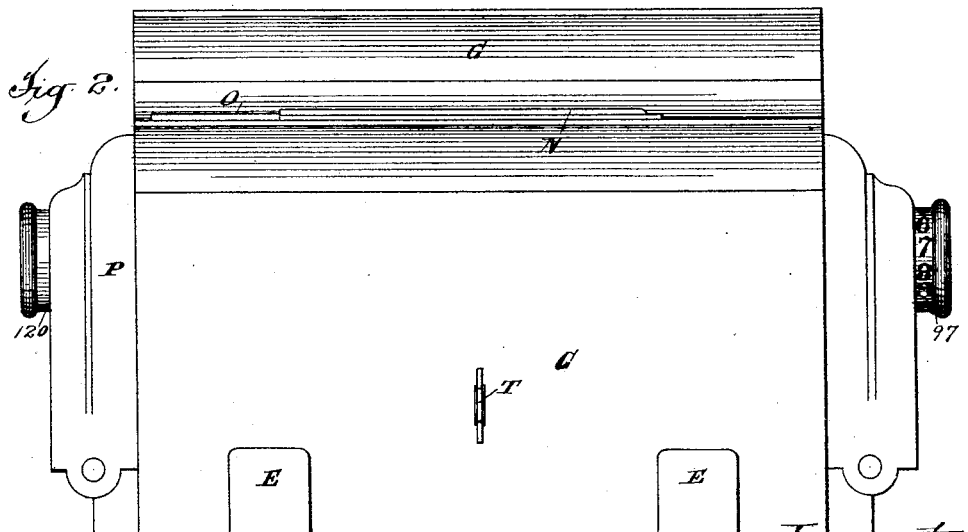
Figure 4:
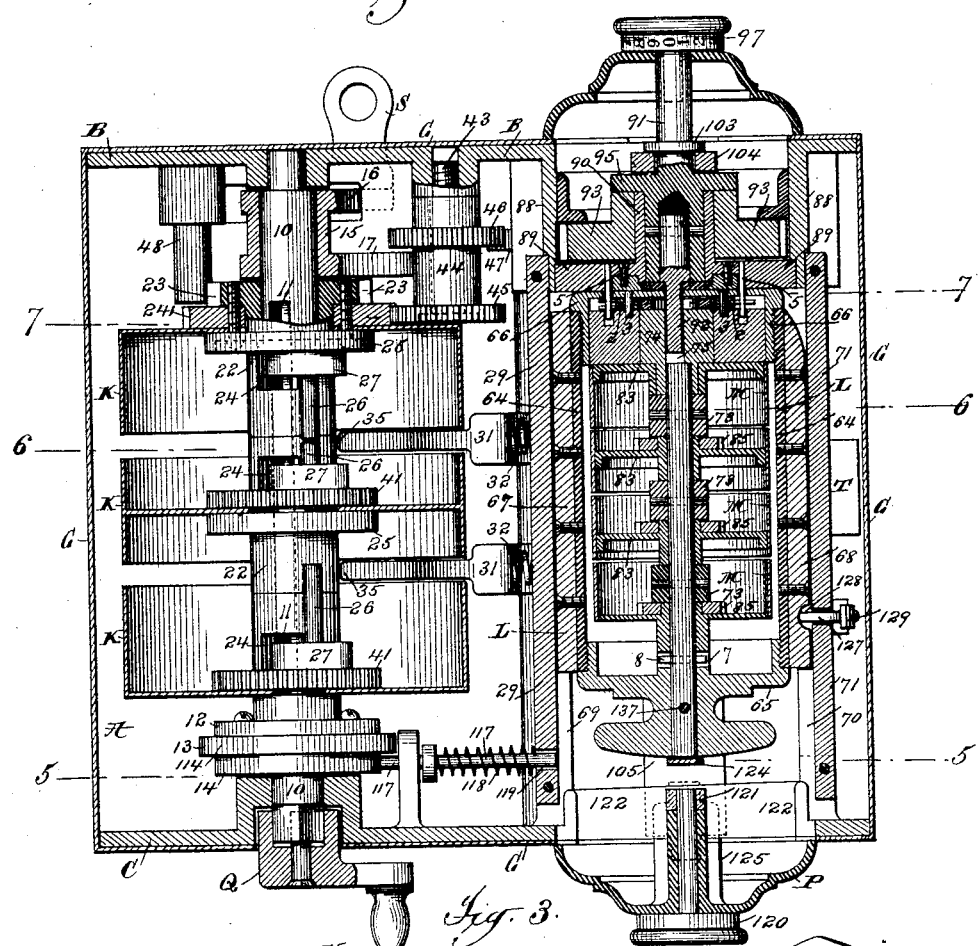
Figure 3:
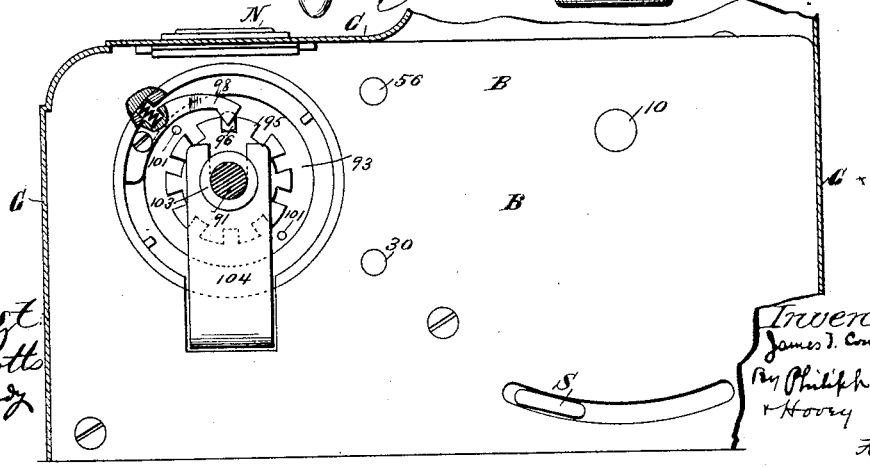
Figure 7:
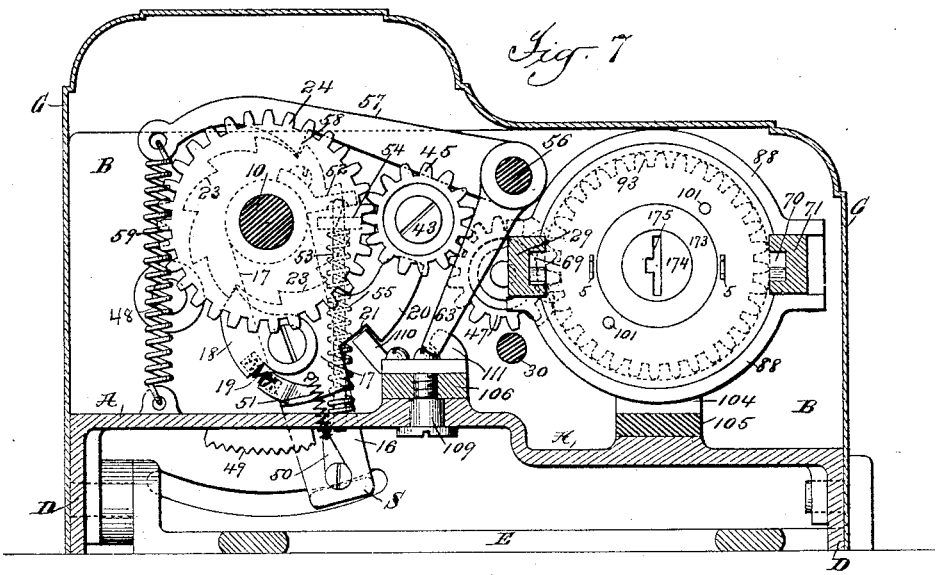
Figure 8:
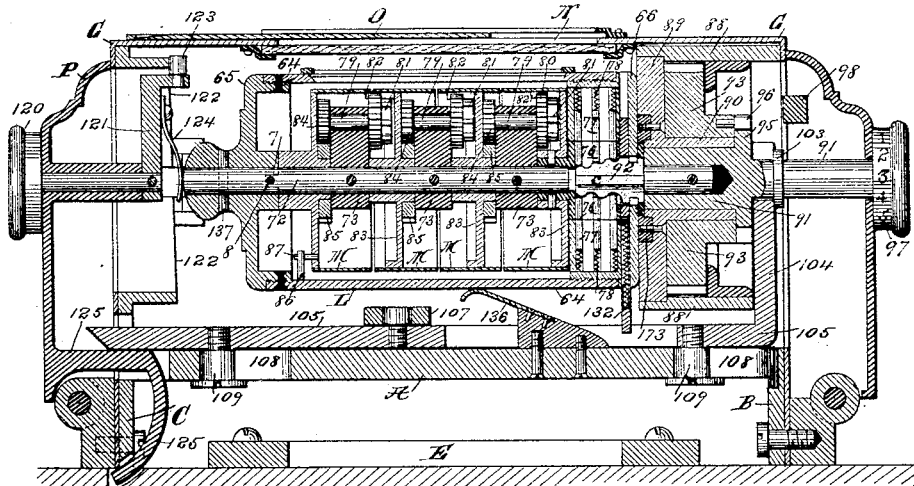
Figure 9:
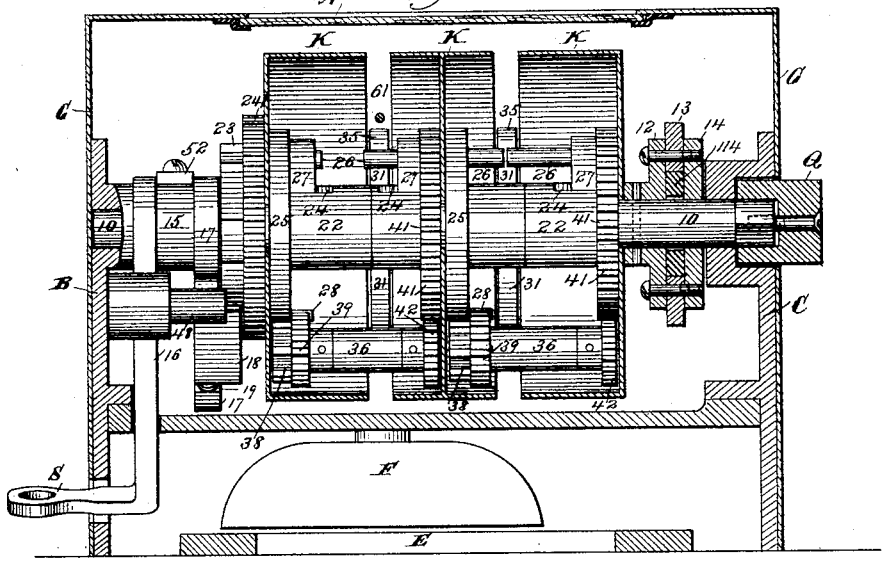
Figure 10:
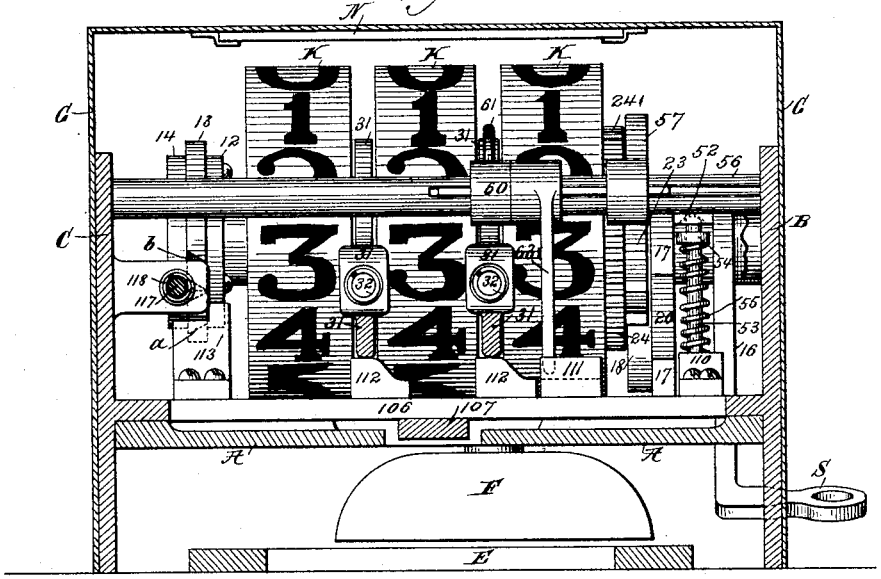
Figure 11:
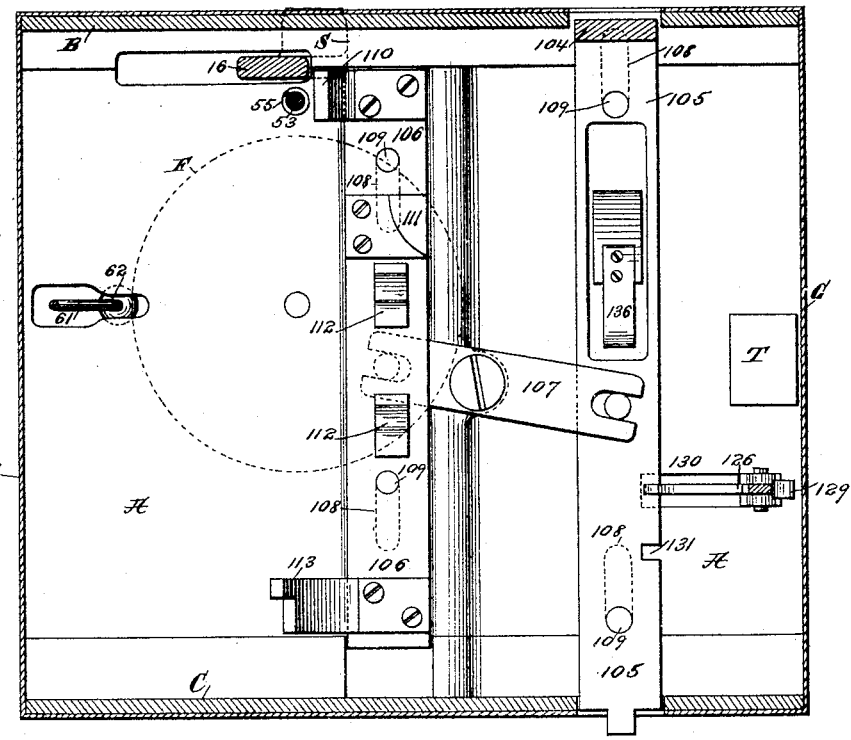
Figure 12:
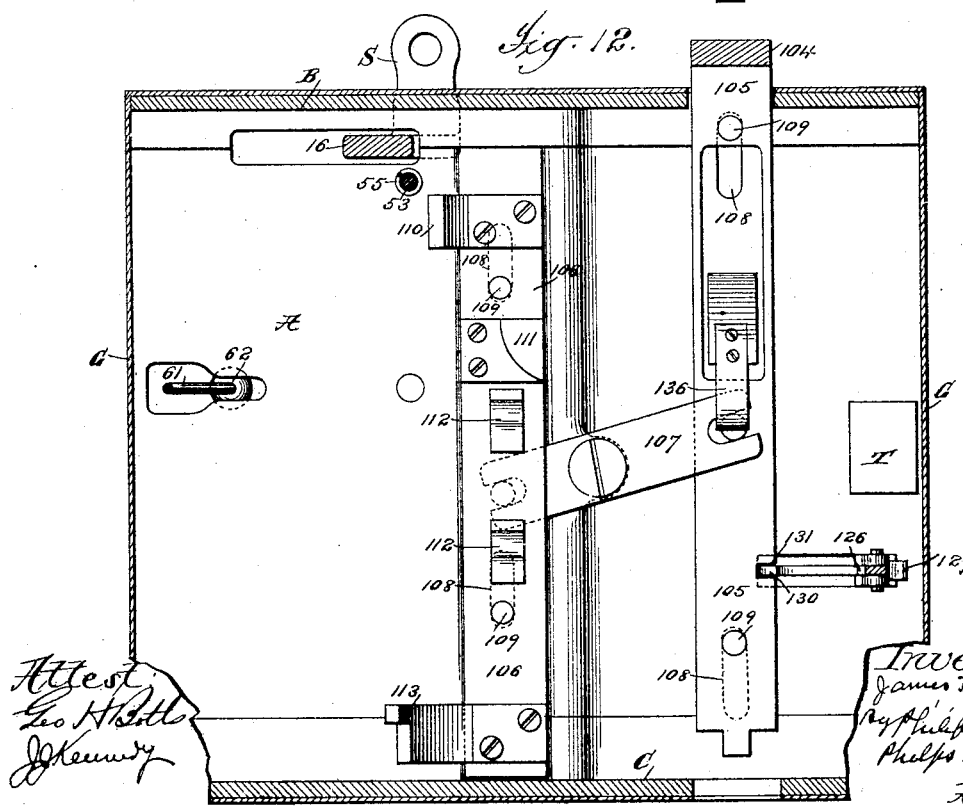
Figure 13:
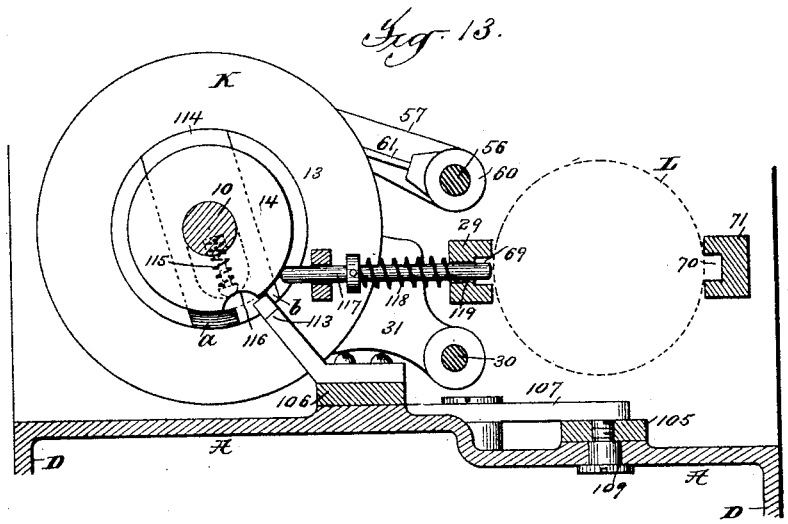
Figure 14:
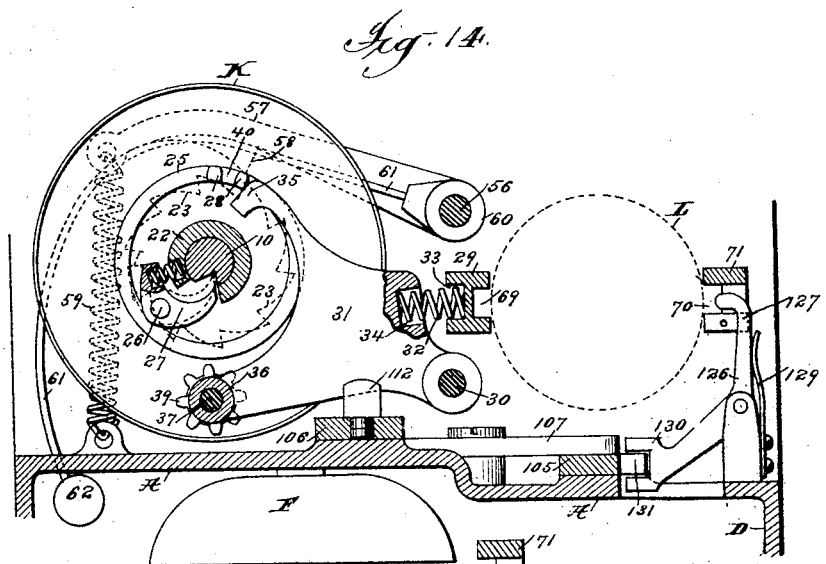
Figure 30:
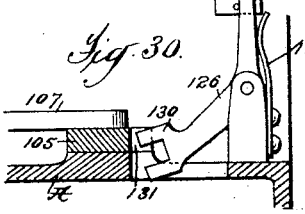
Figure 35:
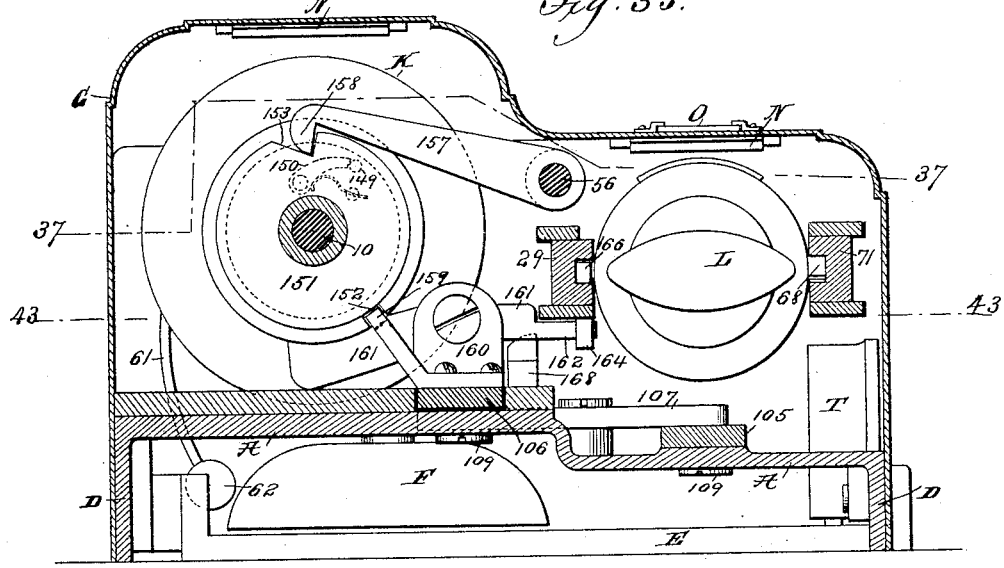
Figure 36:
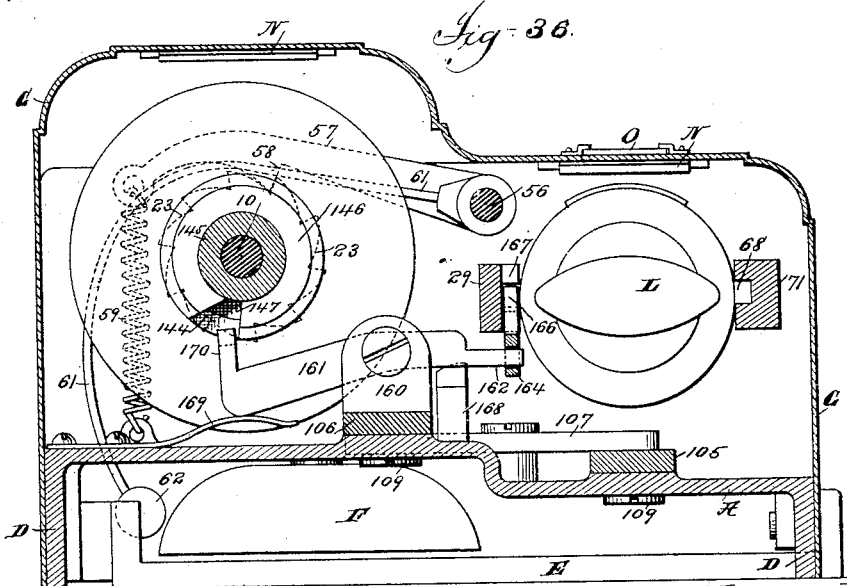
Figure 39:
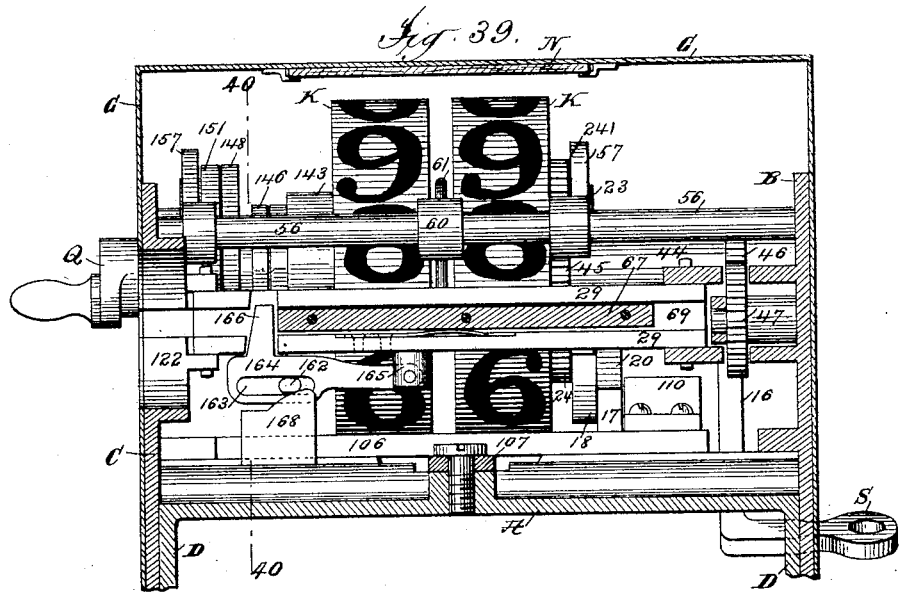
Figure 40:
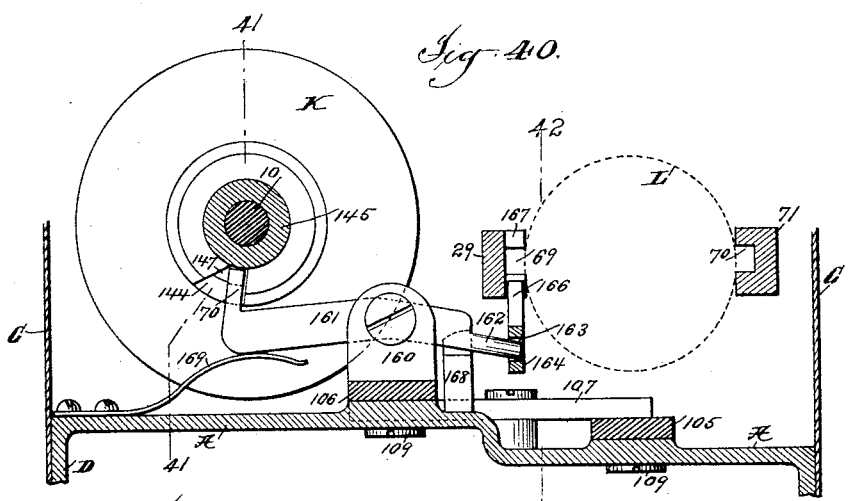
Figure 41:
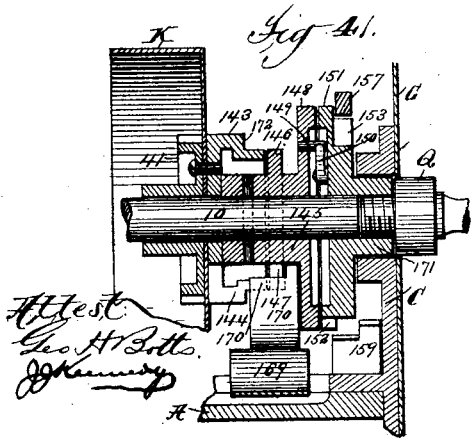
Figure 42:
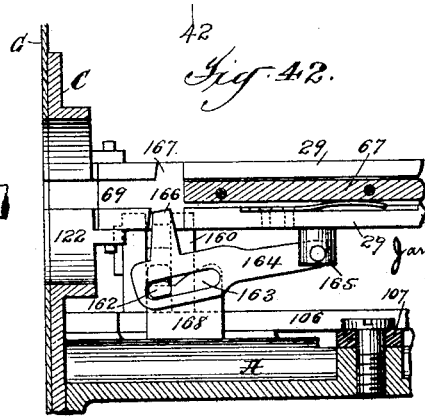

Figure 1 is a plan view of my fare-register. Fig. 2 is a front view of the same. Fig. 3 is an elevation, partly in section, of the right-hand side of the register with the case removed. Fig. 4 is a horizontal section taken on the line 4 4 of Fig. 6, showing the parts in their normal operative positions. Fig. 5 is a vertical section on the line 5 5 of Fig. 4. Fig. 6 is a vertical section on the line 6 6 of Fig. 4. Fig. 7 is a vertical section on the line 7 7 of Fig. 4. Fig. 8 is a longitudinal central section of the general register on the line 8 8 of Fig. 5. Fig. 9 is a longitudinal central section of the trip-register on the line 9 9 of Fig. 5, looking toward the front of the register. Fig. 10 is a section on line 10 10 of Fig. 5, looking toward the rear of the register. Fig. 11 is a horizontal section on the line 11 11 of Fig. 6, showing the parts in their normal positions when the trip and general registers are connected. Fig. 12 is a similar section showing the parts in their positions when the trip and general registers are disconnected for the return of the trip-register to zero and the removal of the general register. Figs. 13 and 14 are views similar to Figs. 5 and 6, but showing the parts in their positions during the return of the trip-register to zero. Fig. 15 is a partial section similar to Fig. 8, but showing the trip and general registers disconnected and the door opened for the removal of the general register. Figs. 16 and 17 are detail sections of the mechanism for driving the tens and hundreds disks of the trip-register. Fig. 18 is an end view of the general register, showing the parts in their normal positions with the key-guard lowered, the key being shown in section. Fig. 19 is a section on the line 19 19 of Fig. 18. Fig. 20 is a section on the line 20 20 of Fig. 19, showing the key-guard in position to cover the key-hole when the general register is removed. Fig. 21 is a side view, partly in section, of the general register, showing the tumblers for locking the key-guard. Fig. 22 is a detail section of the same on an enlarged scale. Fig. 23 is a section on the line 23 23 of Fig. 19, showing the pin for locking the outer case of the general register. Fig. 24 is a detail section of the means for locking and unlocking the general-register gear. Figs. 25 to 30 are details hereinafter referred to. Figs. 31 to 34 show modified forms of connections between the general register and the trip-register. Fig. 31 is an end view of the general register, showing a construction employing a stationary key. Fig. 32 is a section on the line 32 32 of Fig. 31. Fig. 33 is an end view of the general register, showing a construction employing a shaft in place of the rotating key. Fig. 34 is a section on the line 34 34 of Fig. 33. Figs. 35 to 44 show a register employing a modified form of locking mechanism and means for returning the trip-register to zero. Fig. 35 is a section on the line 35 35 of Figs. 37 and 38, showing the parts in their normal operative positions. Fig. 36 is a section on the line 36 36 of Figs. 37 and 38. Fig. 37 is a horizontal section on the line 37 37 of Figs. 35 and 38. Fig. 38 is a section on the line 38 38 of Fig. 37, looking toward the front of the register. Fig. 39 is a section on the line 39 39 of Fig. 37, looking toward the rear of the register. Fig. 40 is a section on the line 40 40 of Fig. 39, showing the parts in their positions with the key withdrawn and the trip-register returned to zero. Fig. 41 is a detail section on the line 41 41 of Fig. 40, looking to the right or the front of the register. Fig. 42 is a detail section on the line 42 of Fig. 40, looking to the left or the rear of the register. Fig. 43 is a horizontal section on the line 43 of Fig. 35, showing the parts in their normal operative positions; and Fig. 44 is a similar section showing the parts in their positions with the key withdrawn and the trip-register returned to zero.

Referring to said drawings, A is the base-plate, and B C the side frames, of the register, these parts forming the support for the operating parts. The base-plate A is provided with standards D, by which it may be secured to the frame-work of the car E by lock and key T, the base-plate thus being supported at a distance from the car, providing space for the bell F. The frame formed by the base-plate A and side frames B C is inclosed by a casing G, made removable to afford access to the registering mechanism. Within the casing G are the disks K of the trip-register and the general register L, provided with the disks M. The general register with its disks is made removable; but the disks of the trip-register are permanently mounted in the frame of the machine, and the casing G is provided with the usual rectangular sight-openings N, the sight-openings of the general register being preferably provided with a slide O, by which the readings of the general register may be concealed, with the exception of the final figure.

For convenience of description, the entire register will be considered as supported in a horizontal position and as divided into two parts by a line drawn between the trip and general registers, and the part containing the general register will be termed the "front" end and that containing the trip-register the "rear" end of the machine, the side frames B C thus forming, respectively, its right and left sides.

Upon the left side of the register at the front end is a hinged door P, through which the general register may be removed, and at the rear end is a crank Q, projecting outside the casing, for returning the trip-register to zero. At the right-hand side of the register, at the front end, the casing G is provided with an opening, through which extends the key-shaft, and at the rear end with a slot for the prime mover S, by which the registering mechanism is operated, this prime mover being actuated by a cord, as usual, or in any other suitable manner.

It will be understood that the general construction of the register may be of any suitable form, as this constitutes no part of the present invention; but the construction shown and thus briefly described forms a very compact and convenient arrangement, well adapted for containing and supporting the parts in which my invention is embodied.

Passing now to the construction of the operating parts of the machine, the construction of the trip-register will first be described.

In the side frames B C, at their rear ends, is mounted a shaft 10, on which are loosely mounted the disks K of the trip-register. This shaft 10 is provided with a groove or series of notches 11, extending longitudinally of the shaft opposite the register-disks, and at the left-hand side of the register with a series of disks 12 13 14, secured rigidly to the shaft, for a purpose hereinafter to be described. To this shaft 10 is removably secured the crank-arm Q, by which the trip-register disks are returned to zero. At the right-hand side of the register a sleeve 15 is mounted loosely upon the shaft 10 and provided with a depending arm 16, forming a part of the prime mover S, and with a second depending arm 17, to which is pivoted a pawl 18, spring-pressed by a spring 19, and which is provided with a stop-arm 20, extending toward the front of the machine and having a transverse notch 21. As shown, the trip-register has the usual units, tens, and hundreds disks K, these three disks being sufficient for all the usual requirements in this class of registers; but the number may readily be extended as desired. The units-disk K is secured to a sleeve 22, loose upon the shaft 10, carrying outside the disk a ratchet 23 and gear 241, these parts being rigidly secured to a locking-disk 25 upon the sleeve inside of the units-disk. The sleeve 22 is slotted at 24, and the disk 25 carries a pin 26, upon which is loosely mounted a spring-pressed pawl 27, adapted to extend through the slot 24 and engage the shaft 10 in the groove 11 on movement in one direction, but to permit the sleeve and shaft to move independently of each other in the other direction. The disk 25 of the units-disk K is provided with two pins 28, extending inward from the side of the disk for actuating the tens-disk.

The construction of the tens and hundreds disks of the trip-register is substantially identical with that of the units-disk, except that the hundreds-disk is not provided with the locking-disk 25 and actuating-pins 28, this disk being the last of the series. The same reference-letters, therefore, will be used for corresponding parts throughout the series of disks and their operating mechanism.

The driving-gears for the tens and hundreds disks are supported and constructed as follows: Between the trip-register and the general register a bar 29 and shaft 30 extend longitudinally of the registers, these parts being supported in the side frames B C. Upon the shaft 30 are loosely mounted two supports 31, adapted to swing in a vertical plane between the units and tens and tens and hundreds disks, these supports being held normally in their lowest position by means of springs 32, held within recesses 33 34 in the bar 29 and supports 31, respectively, as shown clearly in Fig. 6. The support 31 between the units and tens disks is provided at its rear end on the upper side with a stop 35, adapted to engage the pins 26 of the units and tens disks on their return to zero, and on its lower side carries a sleeve 36, within which is supported to rotate a short shaft 37, extending between the units and tens disks. At one end below the locking-disk 25 of the units-disk the shaft 37 carries two gears 38 39, the outer gear 38 having half the number of teeth of the gear 39 and rotating opposite to the surface of the disk 25, which engages two of the gear-teeth, thus locking the gear and shaft against movement. The gear 39 is in position to be engaged by the pins 28 and rotated two teeth as the units-disk completes a revolution. The disk 25, as shown plainly in Figs. 16 and 17, is provided with a notch 40 just in the rear of the pins 28, with which the rear engaging tooth of the gear 38 registers when the pins 28 are in position to actuate the gear 39, and into which it passes upon the rotation of its shaft. Upon its opposite end below and normally in engagement with the driving-gear 41 of the tens-disk the shaft 37 carries a gear 42, having the same number of teeth as gear 39, and gear 41 has twice the number of teeth that the disk has figures, the rotation of the shaft 37 two teeth thus rotating the gear 41 to advance the tens-disk one figure. It will be seen that by this construction the disk 25 rotates in contact with the two teeth of the gear 38, and thus holds the latter and the tens-disk firmly locked against movement until the pins 28 are brought into position to actuate the gear 39, when the notch 40 is opposite the rear engaging tooth of the gear 38 and the rotation of the shaft 37 and tens-disk is permitted.

The operation of the tens and hundreds disks is the same as that described. When the supports 31 are swung to their lowest positions, the shafts 37 and gears 38, 39, and 42 are carried out of engagement with the operating parts carried by the registering-disks, and the latter may then be rotated independently of each other. Upon a stud 43, mounted in the side frame B, is loosely mounted a sleeve 44, carrying gears 45 46, the gear 45 engaging the gear 241 of the units-disk and the gear 46 a gear 47, by which the general register is operated. A stud 48 extends inward from the frame B in position to engage the driving-pawl 18 and lock the latter and the ratchet 23 against further movement when the units-disk has been rotated one figure by the movement of the prime mover. The base-plate A is provided with a curved rack 49, concentric with the line of movement of the prime mover, and arm 16 of the prime mover carries a pivoted pawl 50, which engages the rack 49, being held in engagement therewith when opposite the rack by means of a spring 51. The pawl prevents the reversal of the direction of the arm and prime mover until the pawl passes off the rack, so that the prime mover cannot be returned to its normal position without the completion of an operating movement once commenced. The sleeve 15 is provided with a shoulder 52, secured thereto, as shown, or formed integral therewith and engaging a pin 53, moving vertically through the base-plate A and forced upward against the shoulder 52 by means of a spring 55, pressing an adjustable collar 54 on the pin 53, this spring operating to retract the prime mover and the pawl 18 to their normal positions when released after an operating movement. Upon a shaft 56, above the bar 29 and extending parallel therewith, is an arm 57, provided with a pawl 58, engaging the upper side of the ratchet 23 and normally pressed against the same by means of a strong spring 59, this arm 57 forming a bell-trip. Upon the shaft 56 is secured also a sleeve 60, carrying a hammer-arm 61 and bell-hammer 62. The sleeve 60 or shaft 56 carries a depending arm 63, by which the shaft 56 may be rotated and the bell thrown out of operation, as hereinafter explained.

The construction of the general register and its operating mechanism will now be described. The general register L consists of an outer cylindrical casing 64, closed by two heads 65 66, forming the respective ends of the register, the head 65 being riveted to the casing, as shown, or otherwise secured against removal, while the head 66 is made removable, being screwed into the casing. The casing 64 is provided with ribs 67 68 on either side, the rib 67 sliding in a groove 69, formed on the front side of the bar 29, and the rib 68 in a groove 70, formed in the inner side of a bar 71, mounted in the frames B C and extending parallel to and on the opposite side of the general register from bar 29, the general register thus being supported within the casing by the ribs and grooved bars. The head 65 carries a shaft 72, extending longitudinally of the general register and loosely mounted in the head 66, upon which shaft are loosely mounted the register-disks M and by which are supported blocks 73 between the disks for supporting the gears for driving the successive disks. The units-disk M is rigidly connected to a cylindrical block 74, provided with a key-slot 75, and a series of pins 76 on each side of the key-slot, these pins 76 being normally pressed inward by pins 77 and springs 78, ten series of which, registering with the digits of the units-disk, are carried in the stationary head 66, thus forming a pin-lock with pins on both sides of the key in any position of the units-disk and block 74. For the purpose of guiding the key and holding it firmly in a central position against the tension of springs 78 on opposite sides, I provide key 92 with a longitudinal rib c, preferably central of the key, as shown, and the block 74 with a corresponding groove. The opposite sides of the key and block may similarly be formed, if desired.

The construction of the locking-disks and driving-gears for the tens, hundreds, and thousands disks is identical, and the description of one set of gears will suffice, the corresponding parts in the other sets being similarly numbered. The stationary block 73 forms a bearing for a short shaft 79, extending between the units and tens disks and provided at the units end with gear 80, adapted to be engaged by two pins 82, extending inwardly from a flange on a locking-disk 83 inside of and moving with the units-disk and with gear 81, two teeth of which are engaged by the inner surface of the flange, the gear 81 having half as many teeth as the gear 80. At its other end the shaft 79 carries a gear 84, which engages a gear 85 on the tens-disk. The flange 83 is provided with an opening, which is entered by the rear tooth of gear 81 to permit the rotation of the shaft 79 and tens-disk when the pins 82 are in position to actuate gear 80, and the entire construction and operation of these parts is exactly the same as that of the trip-register, as fully shown in detail in Figs. 16 and 17, and heretofore described, except that the locking-surface is on the inside of the locking-disk and an interior gear is employed upon the tens-disk, a more compact construction being thus provided. In returning the general register to zero the disks will be reversely actuated, and a stop-pin 86, supported on the inner side of the casing 64, engages a pin 87, carried by the thousands-disk, to stop the disks at zero. If it is not desired to return the disks to zero in all cases, a common one-way holding-pawl may be used, allowing the movement of the disks indefinitely in one direction, but stopping them at zero whenever returned to that point by reverse movement. Opposite the inner end of the general register the side frame B is constructed with flanges 88, extending inward and providing a space, within which are mounted the operating connections between the general register and the trip-register, a disk 89 being secured within the flanges and closing the inner end of the cylinder formed thereby. The disk 89 (see Figs. 4, 8, and 24) is provided with an outwardly-extending sleeve 90, forming a bearing for a shaft 91, carrying the key 92, and for a gear 93, engaged and operated by the gear 47, connected to the prime mover and trip-register. The key 92 enters the key-slot 75 in the block 74, the outer plate of the head 66 being provided with a series of notches 94 and the key 92 with notches on opposite sides registering with the teeth formed by notches 94, so that the key may enter the block in any of the ten positions of the latter and the units-disk, and may then be rotated, but cannot be removed except when the notches in the key and head are in registry, thus preventing the withdrawal of the key when the units-disk is between two figures and the locking-pins not in operative position. The shaft 91 is provided with a toothed wheel 95, engaged by a pin 96, carried by the gear 93, to connect the gear and key-shaft when the key is introduced into the general register, an operative connection thus being formed between the gear 93 and the general-register disks. The key-shaft 91 extends through an opening in the casing G, and is adapted to be moved inwardly and outwardly in the sleeve 90 for engagement with or disengagement from the general register, being provided outside the casing with a disk 97, numbered to correspond with the units-disk, by which the key may be rotated into proper position to enter the key-slot in the general register, this being possible only when the numbering upon the disk 97 and upon the units-disk agree and the key and key-slot register. When the key is withdrawn, the toothed wheel 95 is brought into position to be engaged by a spring-pressed holding-pawl 98 to assist in the accurate positioning of the key, the notches in the wheel 95 registering exactly with the numbers upon the disks 97 and M. The construction of this pawl 98 is shown clearly in Figs. 3, 25, and 26. The construction thus far described covers the mechanism by which the prime mover operates the trip-register and simultaneously actuates the general register for a continuous record of the fares received.

The various locking devices in the preferred form and the parts co-operating therewith will now be described. The gear 93 (see Fig. 24) carries a series of sliding pins 99, normally held by springs 100 in position to lock the gear 93 to the stationary disk 89, these pins being constructed, as shown, so as to extend different distances into the disk. In disk 89 are mounted a series of sliding pins 101, normally pressed outward beyond the face of the disk by pins 99, the pins 101 being formed with shoulders, which, with corresponding shoulders on the disk 99, act as stops to limit the inward movement of the pins 99 and 101. The head 66 of the general register is provided with a series of recesses 102 of different depths, which upon the introduction of the general register into the casing register exactly with the pins 101, and when the general register is pressed close up to the disk 89 the pins 101 and 99 are moved inward, so that the pins 99 do not protrude within the disk 89 and the gear 93 is free to rotate. On the removal of the cylinder the gear 93 is locked by the pins 99, and cannot be unlocked without pressing in the pins 101 to different distances, which practically can be accomplished only by the introduction of the general register with the recesses of varying depths. But two locking-pins are shown, but it is evident that their number may be increased for additional security. As already stated, the key 92 and key-shaft 91 may be withdrawn by the disk 97 to the position shown in Fig. 15, thus breaking the connections between the key and register-disks and between the gear 93 and the key, the key upon its withdrawal being moved out of the key-slot in the block 74 and the wheel 95 out of engagement with pin 96. As the wheel 95 is moved outward it is engaged by the holding-pawl 98. The key-shaft 91 is provided with a collar 103, between which and the wheel 95 is held a slotted arm 104, extending vertically from the plate 105, sliding longitudinally of the general register upon the base-plate A of the machine. This slide 105 is connected to a second sliding plate 106 by means of a bar 107, pivoted to the base-plate A of the register, as shown in Figs. 11 and 12, the two slides 105 and 106 thus moving in opposite directions and being provided with pins 109, entering slots in the base-plate A, so that the movement of the slides is limited in both directions. The slide 106 carries a stop 110, adapted to enter the notch 21 in the arm 20, a cam 111 engaging the arm 63, cams 112 engaging the swinging gear-supports 31, and a stop 113 co-operating with the disk 13, all as fully described hereinafter.

The special construction of the disks 12, 13, and 14 is as follows: The disks 12 and 14 are of equal diameters and the larger disk 13 is secured rigidly between them, the three disks being carried by and moving with the shaft 10. The disk 13 is slotted centrally, as shown in Figs. 5, 9, and 13, and a slotted plate 114 slides therein transversely to the shaft, the plate 114 being held normally in position, with its outer edges forming a continuation of the circumference of the disk 13 by means of the spring 115. One end of this plate 114 is formed with a curved face, which completes the circle of disk 13, and the other end is formed with two reversely-beveled surfaces $a$ $b$, as shown in Figs. 5, 13, and 27 to 29, these reversely-beveled surfaces being engaged by the stop 113 on the slide 106, so that the slide may be moved past the disk 13 from either side when brought opposite a beveled face, but be held from movement when brought against the plane side of the plate or the edge of the disk 13, the spring 115 yielding to permit the plate 114 to slide transversely of the shaft as the stop 113 passes the plate. The disk 14 is provided with a notch 116, which is entered by a sliding pin 117, normally pressed rearward by means of a spring 118, but forced forward through an opening 119 in the bar 29 by disk 14, so as to lie in the path of the rib 67 and prevent the withdrawal of the general register, except when the pin 117 is opposite and withdrawn into the notch 116. The notch 116 registers exactly with the pin 117 in the zero position of the trip-register, so that the general register is locked against withdrawal, except when the shaft 10 is in the position corresponding to zero of the trip-register disks. As the trip-register disks rotate forward independently of the shaft 10, their registering movement does not affect the position of the disks 14 and pin 116, and the pin is withdrawn from the path of the general register during the normal operation of the machine, as shown in Fig. 5.

For locking the general register within the casing during the normal operation of the machine, the following means are provided: The hinged door P, by which the general register is introduced into and removed from the machine, is provided with knob 120 outside the casing, which rotates inside the casing an arm 121, carrying a pin 123, moving over the cam-surface 122 to secure the door. A spring 124, carried by the arm 121, presses against the end of the general register and holds it in position with the head 66 pressed against the disk 89 to release the gear 93, as previously described. This door P is provided, also, with an inwardly-extending arm 125, which, as shown in Fig. 8, is held by the slide 105 in position to lock the door when the key is inserted into the general register, but is free to swing upward for the opening of the door when the key and slide are withdrawn, as shown in Fig. 15. In standards on the base-frame is pivoted a bar 126, swinging in a vertical plane, its upper end forming a stop 127, normally pressed forward into the groove in bar 71 and into engagement with the beveled notch 128 in the rib 68 on the general register by means of a spring 129. The bar 126 carries at its lower end a forked stop 130, the forks embracing the edge of the slide 105, so as to permit the latter to slide between the forks when the upper bar 126 is rocked backward into the position shown in Figs. 5, 6, and 14, by the engagement of the stop 127 with the general register. The slide 105 is provided with a notch 131, which registers with the stop 130 when the slide is withdrawn into the position shown in Figs. 12 and 14, and upon the removal of the cylinder the bar is rocked by the spring 129 into the position shown in Fig. 30, the upper fork of the stop engaging the slide 105 by a notch 131, so that the return of the slide is prevented until the general register is reintroduced and the stop 130 raised. The end of the rib 68 on the general register is beveled, as shown in Fig. 4, for the purpose of throwing out the stop 127 upon the introduction of the general register into the casing, and the recess 128 in the rib 68 is likewise beveled to permit the withdrawal of the cylinder. It will be seen, however, that the cylinder cannot be withdrawn or introduced except when the notch 131 is brought into register with the stop 130 by the withdrawal of the slide, as otherwise it is impossible for the bar 126 to be rocked to move the stop 127 outward. Any number of these rocking bars and stops may be used.

For the purpose of concealing the key and key-slot, so as to prevent the taking of an impression or otherwise discovering the particular formation of these parts, the following means are provided: As shown in Fig. 15, the key upon its withdrawal is brought entirely within the chamber formed by the flanges 88 and disk 89, so that it is impossible to reach the key from the inside of the casing, and, as clear from the preceding description, it is impossible to push the key in until the general register is again inserted and the door closed, as the movement of the slide 105 is prevented by the stop 131 and by the arm 135 on the door. The key is further protected, as shown in Figs. 7 and 24, by securing in the head 89 a flanged plate 173, by which is held a plate 174, rotating with the key and having a key-hole 175, through which the key passes when pushed into the general register. On the withdrawal of the key no cast can be taken through the key-hole 175. The key is thus fully protected.

For concealing the key-slot the construction shown in Figs. 4, 8, and 18 is employed. The inner head 66 of the general register is slotted and a plate 132 slides therein transversely to the axis of the register, this plate being provided with an opening 133, which registers with the key-slot 75 when the plate is in its lower position, in which it is normally held by means of the spring 134, secured in a groove on the inner side of the plate and pressing at one end against the plate and at the other end against a stud 135 on the head 66, projecting into the groove. The plate 132 is provided with notches 1 on its opposite edges, which are engaged by a series of tumblers 2. These tumblers 2 are pivoted on pins 3 in the head 66 and are firmly pressed against the plate 132 and into notches 1 by means of springs 4.

For the purpose of withdrawing the tumblers from the notches 1 on the introduction of the general register into the casing notched keys 5 are preferably secured in the disk 89 in position to enter key-slots 9 in the head 66 and engage projections 6 upon the tumblers, so that by the insertion of the general register the tumblers are brought exactly to the position in which they are all withdrawn from the notches 1, and plate 132 is permitted to be moved into its lower position by means of the spring 134, thus uncovering the key-slot. Upon the withdrawal of the general register the plate 134 is moved into its upper position by means of the incline 136, formed by a spring mounted in the base-plate A, the tumblers being released by keys 5 and springing into the notches, as shown in Fig. 20, to secure the plate in its upper position. Thus the plate cannot be withdrawn while the register is removed, except by the use of keys corresponding exactly to the keys 5 in the disk 89. By the use of such keys, however, the plate may be withdrawn and the disks may then readily be set back to zero by the use of a key similar to the key 92, which may be rotated by hand or by power, as desired. The keys 5 may slide in the head 89 and be moved by hand to unlock the guard, or any other suitable means may be used for returning the guard to position. The incline 136, also, may be mounted upon the slide 105 and the movement of the latter control the position of the guard.

The disks of the general register may readily be reached for the purpose of repair by unscrewing the head 66 and removing the pin 137, which secures the shaft 72 in the head 64. The shaft and disks may then be withdrawn from the casing.

In order that the general register may not be opened except by one provided with the proper key, the casing 64 and the screw-threaded flange of the head 66 are provided with openings, and a pin 138 slides within these openings and bears against the block 74, which is provided with a recess 175, the end of the pin 138 and the recess 175 being so formed that the rotation of the block 74 will force the pin 138 out and allow the block 74 to rotate independently of the head. This pin 138, when pressed out by contact with the circumference of the block 74, passes through the casing 63 and locks the casing and head together, the pin being provided with a shoulder which prevents the pin from being forced beyond the outer surface of the casing, as shown in Fig. 23. When the pin comes opposite and is pressed into the recess 175, the casing 63 is released and the head 66 may be unscrewed.

In constructing the register the openings and recess will be placed to register between some two of the numbers upon the units-disk, the particular point of registry being known only by the person whose duty it is to open the register. Thus it will be impossible for one to unlock the casing from the head 66 unless he knows the particular numbers on the units-disk between which the recess is located and is provided with the proper key to turn the register-disks until the recess registers with the openings in the casing and head.

To prevent the shaft 72 being rotated in the head 65 after driving out the pin 137, thus rotating all the disks except the units-disk backward one revolution, the head is provided with an inwardly-extending sleeve, through which the shaft 72 passes. The inner end of this sleeve is slotted at 7, as shown in Figs. 4 and 8, and a pin 8 passes through the shaft and slot, so as to prevent the rotation of the shaft inside the head, while permitting it to be withdrawn therefrom.

The operation of the fare-register in connection with the system above outlined will now be described: Assuming that the conductor has received his general register and been charged with the number on its registering-disks, and that the general register has been placed in position in the fare-register and connected to the prime mover, the parts will be in the positions shown in Figs. 4 to 11, and the operation is as follows: As each fare is received the prime mover S is moved rearward, a full movement being insured by pawl 50. This movement rotates the sleeve 15 against the tension of spring 53, and the pawl 18, engaging the ratchet 23, advances the units-disk K one figure. The pawl 18 then being locked against further movement by the locking-stud 48, and the pawl 18 being wedged between the locking-stud and ratchet, locks the ratchet and register disks against any further movement due to the momentum of the parts and at the same time holds them against rebound. As this movement is made, the tooth of the ratchet 23 by engagement with the trip-pawl 58 on the trip-arm 57 raises the latter against the tension of spring 59 and rocks the shaft 56, thus raising the bell-hammer, and as the ratchet releases the trip-pawl the spring 59 returns the shaft 56 to position and throws the hammer 62 into contact with the bell F. The movement of the shaft 10 is transmitted through the series of gears previously described to the key 92 and rotates the units-disk of the general register one figure. This movement is repeated until nine fares have been registered, when the tens-disks of the two registers are operated by the register-gears previously described, and thus the operation continues, as usual in this class of mechanism. During this operation the shaft 10 is stationary, and the disk 14 is in the position shown in Fig. 5, in which the pin 117 enters the notch 116 and is withdrawn within the opening 119 in bar 29 and out of the path of rib 67, the trip-register disks rotating freely on the shaft, the spring-pressed pawls 27 being retracted from the notches or groove 11. In this position of the parts the slides 105 and 106 are as shown in Fig. 11, and the stops and cams carried by the slide 106 are as shown in Figs. 5, 7, 10, and 11, the stop 110 being outside the arm 20, the cam 111 out of engagement with the arm 63, the supports 31 raised by the cams 112, so as to bring the register-gears into operative position, and the stop 113 inside the disk 13 and opposite the plane surface of the plate 114. The slide 105 is in its forward position, as shown in Fig. 8, locking the door P, so that the latter cannot be opened for the removal of the general register, and the notch 131 in the slide 105 being out of register with the forked stop 130, the general register is locked also by the stop 127. The guard-plate 132 is in its lowest position, the tumblers 2 being withdrawn by the keys 5. Assuming now that it is desired to set back the trip-register to zero and to remove the general register from the machine in order that the record may be taken at the inspector's office or for any other purpose, the operation is as follows: It is evident that the trip-register disks cannot be moved together for the return to zero, because they are locked by disks 25 and gears 38, and that the supports 31 must first be rocked to carry the register-gears out of engagement, and that the connections between the shaft and the general register must be broken to prevent the former being operated by the trip-register returning movement of the latter. It is evident, also, that the key 92 and the slide 105 cannot be withdrawn to release the supports 31 and break the connections between the prime mover and general register without shifting the stop 113 to the opposite or outer side of disk 13, and that this is impossible so long as the stop is opposite the plane surface of the plate 114. It is necessary, therefore, to change the plate 114, so as to bring the beveled surface $b$ opposite the stop, when the slide may be withdrawn. To accomplish this the crank-arm Q is turned to the left of Figs. 4 and 5, or toward the rear end of the register, so as to rotate the shaft 10 and carry the disks 13 and 14 from the position shown in Fig. 5 to that shown in Fig. 13, in which the beveled surface of the plate 114 is opposite the stop 113, and the locking-pin 117 is pressed through the opening 119 by the periphery of disk 14, thus locking the general register against removal. This movement of the shaft is independent of the trip-register disks, as the spring-pressed pawls 27 are not engaged by the groove 11 on movement in this direction, as shown clearly in Figs. 6 and 14. The key may now be withdrawn, moving the key and slides 105 and 106 from the position shown in Figs. 5, 6, 8, and 11 to that shown in Figs. 12, 13, 14, and 15.

By the withdrawal of the key and consequent change of position of the parts the following adjustments are made: The connection between the key and general-register disks is broken, the notched disk 95 is carried out of position to engage pin 96 and into position to engage pawl 98, thus breaking the connections between the key and prime mover, and the pins 77 are forced inward by springs 78, locking the general-register disks against movement till the proper key is introduced. The door P is unlocked by the withdrawal of slide 105, and the notch 131 in the slide is brought opposite the forked stop 130. The stop 110 on slide 106 is moved into the slot 21 in the arm 20, thus locking the pawl 18 and prime mover against movement. The cam 111 rocks the arm 63 forward, so as to raise the rock-arm 57 from engagement with the ratchet 23 and carry the hammer 62 out of position to engage the bell F, thus rendering the latter inoperative. The cams 112 are moved from beneath the supports 31 and the latter rocked by springs 32 into their lower position, in which the register-gears are out of engagement, and the zero-stops 35 are in position to engage the pins 26 on the return of the register-disks to zero. The key cannot now be reinserted in the general register and the parts reconnected for operation without the return of the crank-arm Q to its normal position, because the stop 113 has passed the beveled surface $b$ of the plate 114 and is now opposite the plane surface on the other side of the plate. The general register, moreover, cannot be removed, although the door and stop 126 are released, because the locking-pin 117 is held in its path by disk 14. It is absolutely necessary, therefore, that the disks of the trip-register shall be fully returned to zero before the slide can be returned to its normal position for engagement of the key with the general register and the operation of the machine. The crank-arm Q being now rotated forward, the groove 11 in the shaft 10 will successively engage the pawls 27 of the different disks, according to their position relative to the shaft, as shown in Fig. 14, and will rotate all the disks forward until they are returned to zero, when all the disks are stopped by the engagement of their pins 26 with the stops 35. The disk 14 will thus be moved into the position shown in Fig. 5, with the notch 116 opposite the end of the locking-pin 117 and the beveled surface $a$ of the plate 114 opposite the slide 113. The locking-pin therefore will be withdrawn into the notch by the tension of spring 118, leaving the general register free to be withdrawn. If the general register is not to be withdrawn, but the conductor is to continue the record for another trip, the key and slides 105 and 106 will now be returned to their normal operative positions by pushing the key 92 into the general register, when the operation will proceed as before, this movement of the slides being permitted by the stop 113 being opposite the beveled surface $a$ of the plate 114.

If the register is to be withdrawn, this must be done before the parts are returned to position, as this return of the parts relocks the door and the stop 126. The door being opened and the register removed, the stop-arm 126 is rocked by means of the spring 129, the stop 127 being free to move inward, and the forked stop 130 is moved from the position shown in Fig. 14 to that shown in Fig. 30, thus locking the slide against movement until the general register is replaced. The stop-arm 125 also, as shown in Fig. 15, now locks the key and slide against inward movement till the door is closed. As the general register is withdrawn, the guard-plate is raised and locked over the key-slot by the cam 136 and the tumblers 2, as previously described, thus protecting the key-hole. The pins 99 being released by the withdrawal of the register are forced outward by springs 100 and lock the gear 93 to the disk 89, preventing the operation of the prime mover and trip-register till the gear is unlocked. When the general register is removed, the disks may be operated to return them to zero or for any other purpose only by one having keys corresponding to keys 5 and 92, and the casing 65, moreover, can be removed only by one having the key 92 and knowing the location of the recess 175, as previously explained. When the general register is to be replaced, the stop 127 is thrown outward by the beveled end of the register, raising the stop 130 and unlocking the slide 105, keys 5 release the tumblers and the guard-plate 132 is withdrawn to uncover the key-slot, and the pins 99 are pressed outward to unlock the gear 93. The door is then closed and secured by the arm 121, the spring 124 holding the general register in position. The disk 97 is now rotated to bring the key 92 into registry with the key-slot 75, and the key may then be pushed inward, reconnecting the prime mover, key, and general register-disks, and unlocking the latter. The slide 105 moves from the position shown in Figs. 12 and 15 to that shown in Figs. 11 and 8, thus relocking the door by stop-arm 125 and locking the general register by the arm 127. The slide 106 moves from the position shown in Figs. 12 and 14 to that of Figs. 11, 5, and 10, the stop 110 releasing the prime mover, the cam 111 allowing the bell to operate, the inclines 112 raising the supports 31 into position for the engagement of the register-gears, and the stop 113 returning over the beveled surface $a$ to the inside of the disk 13, thus restoring all the parts to their operative positions. It will thus be seen that when the general register is once connected to the prime mover and the trip-register they cannot be disconnected without setting the trip-register back to zero, and the latter can under no circumstances be set back only partially and the registering operation proceeded with, but a full return to zero must be made. Moreover, the general register can be removed and replaced only when the trip-register is at zero, and the trip-register and prime mover are locked absolutely against operation, except when a general register is in place and the parts positioned for its operation. These features, with the use of a removable general register and the various devices for locking the parts and concealing the key and key-slot from examination, afford great security against fraud on the part of conductors.

Figs. 31 and 32 show a modification in which the key 92, key-shaft 91, and block 74 do not rotate; but the actuating-gear 93, engaged by the gear 47, is carried by or in direct engagement with the units-disk. The arrangement of the locking-pins is the same, except that the spring-pressed pins 77 and their springs 78 are carried by the rotating part and the pins 76 by the stationary part. Thus the introduction of the key 92 positions the pins 77 to release the gear 93 instead of the block 74, as in the construction previously described.

Figs. 33 and 34 show a construction in which a sliding and rotating key is employed; but the key has the form of an angular shaft 137 and the block 74 is rotated thereby, carrying with it a disk 139, secured to or formed integral with the units-disk and provided with the locking-flange and actuating-pins previously described. In this construction the general-register disks are locked by pins moving longitudinally of the general register, the disk 139 carrying a series of spring-pressed pins 140 and the head 66 of the register a corresponding series of pins 141, adapted to be engaged by a series of pins 142, of different lengths, carried by inner side of the stationary disk 89. The disk 139 and the registering-disks are then locked by the withdrawal of the general register and unlocked on the insertion of the general register by the engagement of pins 142 and 141 instead of by the insertion of the key, as in the construction previously described. In order to move the disks of the general register when the latter is removed, it is necessary to push in the pins 140 unequal distances, for which the inspector must be provided with a plate carrying a series of pins similar to pins 141. If desired, the head 66 of the general register of this construction may be provided also with the series of recesses 102 and the locking construction shown in Fig. 24 used, so that the removal of the general register locks both the general-register disks and operating-gear 93.

The machine shown in Figs. 35 to 44 is substantially the same in construction and operation as that previously described, except in respect to the means for returning the trip-register to zero and for locking the general register against removal or introduction at other positions of the trip-register. The modified construction, therefore, will be described only so far as is necessary to explain the new features, the parts corresponding in construction and operation to those of the machine previously described, being designated by the same references. The trip-register in this construction is shown with but two register-disks, this number being sufficient for roads in which the trips are short. The units-register disk K, as shown in Figs. 37 and 38, is not loose upon the shaft, as in the construction previously described, but, with its ratchet 23, gear 24, and locking-disk 25, is secured to the shaft by a pin 142 or in any other suitable manner. The tens-disk K, with its gear 41, is loose upon the shaft and carries on its outer side a disk 143, which is formed in two parts, that next the tens-disk being of greater diameter than the outer part, thus forming a shoulder 172, and is provided with a notch 144, extending the full width of the disk in register with the zero-point of the tens-disk. The disk 143 is preferably flanged, as shown in Fig. 38, and inside this flange is secured to the shaft, by a pin or in any other suitable manner, a sleeve 145, which carries a disk 146, provided with a notch 147, which registers with the zero-point of the units-disk and notch 144 when both the units and tens disks are at zero. This sleeve 145 carries also a larger disk 148, having upon its outer side a pin 149, adapted to engage a spring-pressed pawl 150, carried by a disk 151, mounted to rotate in the frame C by a sleeve 171, to which the crank Q is secured, and which forms a bearing for the end of the shaft 10, as shown in Figs. 38 and 41. The pin 149 and pawl 150 are so constructed that the disks 148 and 151 rotate independently in one direction; but the pin and pawl engage on rotation in the opposite direction. This disk 151 is provided on one side with a square-sided locking-notch 152 and upon its opposite side with a notch 153, one side of which is beveled and the other square, as shown in Fig. 35, these notches 152 and 153 being in the position shown in that figure when the units and tens disks are returned to zero. The sleeve 36, carrying the short shaft 37 and its gears 38, 39, and 40, is carried by a sleeve 154, loosely mounted upon the shaft 10, and held rigidly in place for engagement of the registering-gears by means of a screw 155, passing through a slot 156 in the plate A and entering a boss on the lower side of the sleeve, the slot 156 permitting the accurate adjustment of the sleeves 154 and 36 for the engagement of the registering-disks. The bell-shaft 56 carries at the left side of the machine an arm 157, provided with a beveled pawl 158, which engages the notch 153 in the disk 151 when the register-disks are returned to zero, the free rotation of the disk 151 toward the front of the machine being permitted, but the disk being held against movement in the opposite direction by the pawl 158. The slide 106 carries a stop 159, corresponding in position to the stop 113, previously described, this stop 159 being opposite the notch 152 in the disk 151, so as to pass freely through the same and from one side to the other of the disk 151 when the disk and crank are in the zero position of the register-disks. The slide 106 carries also standards 160, in which is pivoted to oscillate in a vertical plane the locking-lever 161, provided at is front end with a pin 162, which engages a slot 163 in a stop-lever 164, pivoted in the bar 29 by standards 165 and provided with a stop 166, which, in the upper position of the stop-lever, passes through a vertical slot 167 in the bar 29 and lies in the path of the rib 67 of the general register to lock the latter against removal, and in its lowest position is withdrawn from the slot 167 to permit the withdrawal of the register. A stationary cam 168 is mounted in the base-plate A, and when the key is pushed into the general register and the slide moved to the position shown in Fig. 43 the pin 162 is upon the upper part of the cam 168, and the lever 161 is held depressed against the tension of the spring 169, and the stop 166 locks the general register, as shown in Figs. 36 and 39. When the key is withdrawn from the general register and the slide moved to the position shown in Fig. 44, the pin 162 is upon the lower part of the cam and the lever 161 may be oscillated by means of the spring 169 to withdraw the stop 166 from the path of the register, as shown in Figs. 40 and 42. The lever 161 is provided at its rear side with a broad stop-arm 170, which is adapted to enter the notches 144 147 in the disks 143 146, the rear end of the lever being held in its lowest position against the tension of the spring 169 by the circumference of the disks 143 146 when the stop-arm is not opposite the notches and the slide 106 is withdrawn, so that the pin 162 is upon the lower portion of the cam 168.

The operation of the parts described is as follows: When the general register is in place and the key 92 is pushed in to unlock and connect the prime mover and general register for the normal operation of the machine, the parts are in the position shown in Figs. 35 to 39 and 43, the pin 162 on the locking-lever 161 being upon the raised part of the cam 168, thus forcing the stop 166 into position to lock the general register against removal, and the stop-arm 170 at the rear end of the locking-lever is in its lower and inner position out of engagement with the disks 143 and 146, the registering-disks thus being free to be rotated by the prime mover. The stop 159 is in the notch 152 in the disk 151, thus locking this disk and the crank-arm Q against movement in both directions, the disk also being held against movement reversely to the register movement by means of the pawl 158 and notch 153. The registering mechanisms of the trip and general registers may then be operated by the prime mover in the manner previously described, except that in the modified construction the shaft 10 rotates with the units-disk, while the tens-disk is rotated upon the shaft by the register-gears. The free rotation of the shaft and sleeve 145 in the direction for the forward movement of the disks is permitted by the pin 146 passing over the spring-pressed pawl 150. As the register-disks are rotated, it is evident that the notches 144 147 will be carried out of register with the stop-arm 170, so that the stop-arm is free to be thrown upward by the spring 169 only when these disks are returned to the position shown in Figs. 36 and 38, which is the zero position of the register-disks. When the disks of the trip-register are to be returned to zero, the key 92 will be withdrawn from the general register, the slide 106 thus moving toward the left-hand side of the machine and the stop 159 passing out of the notch 152 in the disk 151 and leaving the disk free to rotate with the crank. This movement carries the stop-lever 161 outward into such a position that its pin 162 rests upon the lowest part of the cam 168, and the spring 169 would now rock the lever 161 and withdraw the stop 166 from the path of the general register were not the rear end of the stop-lever held down by contact of the stop-arm 170 with the circumference of the disk 146 and the part of the disk 143 of less diameter. For the withdrawal of the stop 166, therefore, it is necessary that the disks 143 146 should be rotated until the notches 144 147 are in line and opposite the stop-arm, and this position is the zero position of the register-disks, the notch 144 registering with the zero-point of the tens-disk K and the notch 152 with the zero-point of the units-disk. It will be seen that the key cannot be again introduced into the cylinder after it is once withdrawn until the trip-register disks have been fully returned to zero, as the stop-arm 170 strikes against the shoulder 172 and can be moved to the units-disk only when the notch 144 in the disk 143 is in register with it—that is, when the units-disk is at zero. Thus in this construction, as in that previously described, the full return of the trip-register disks to zero must be made before the operation of the register can be recommenced or the general register removed. To return the trip-register to zero, the crank Q is rotated toward the front of the machine, or the right in Figs. 35 and 36, thus rotating the disk 151, and by means of the pawl 150, carried thereby, and the pin 149 on disk 145, the shaft 10 and the units-disk are rotated, operating the tens-disk through the register-gears, as in the usual operation of the machine. As the disk 151 is rotated, the arm 157 is raised, rocking the shaft 56 and carrying the trip-arm 57 out of engagement with the ratchet 23, and the pawl 158 rides upon the outer circumference of the disk until the notch 153 again registers with the pawl 158, thus rendering the bell inoperative and preventing its ringing except once during each revolution. The register-disks are returned to zero by advancing them until the limit of the trip-register record is reached—that is, until ninety-nine is counted—when the next movement brings both the register-disks to zero. With a register numbering to thousands this would involve considerable labor, but with a machine adapted for short trips and counting only to hundreds, it is evident that the labor of returning the disks is slight, as the number of revolutions will always be small. The register-disks having been returned to zero, the key 92 may be reintroduced into the general register, or the latter may be withdrawn. On the inward movement of the key the slide 106 moves freely toward the right-hand side of the machine, as the stops 170 and 159 are both opposite notches in their respective locking-disks. By this movement of the slide the pin 162 is raised by the cam 168 and the general register again locked in position.

It will be understood that while I have not illustrated in connection with the machine embodying the modified construction the various additional devices for locking the general register, throwing the bell out of operation, and covering the key-slot, all these devices are equally applicable to this type of machine, and are omitted only because previously fully described and not essential to the illustration of the modifications. It will be understood, also, that some of the locking devices which have been described may be omitted or others added, and that those employed may be varied widely without departing from my invention, these locking devices being of such a nature as to be readily modified or added to by one skilled in the art, and the devices shown and described constitute only the form of devices preferably employed by me.

While I have shown special forms of registering mechanism for the trip and general register, it will be understood that any of the ordinary forms of registering mechanism may be used in connection with my removable general register, and that the improvements in registering mechanism and many of the locking devices are equally applicable in other registers of all kinds, whether employing a removable general register or not, and that certain of the locking features are independent of the trip-register and form parts of my invention, whether one or more registers be used with the prime mover.

While I have applied the term "key" to the part controlling the connections between the prime mover and general register, and have shown a common form of key as preferably employed for this purpose, I do not intend to limit myself thereto; but by the term "key" I intend to cover any movable part operating as claimed, whatever be its form or the special means by which it controls the connections.

While I have shown and described my invention as applied to fare-registers, and it is of special value as applied to this class of registers, my invention is not to be thus limited; but the features claimed as my invention I intend to cover in all forms of registering apparatus, and while I have used the terms "trip" and "general register" as those in common use in fare-registers, it will be understood that these are employed only for convenience, and that the term "trip-register" is intended to cover a register of any form or period of registration and the term "general register" any register coacting therewith to register a number of the registering movements of the trip-register.

While I have shown the registering mechanism of the trip and general registers as consisting of series of tens-disks, and this is the preferred form, it will be understood that my invention may be embodied in a machine employing other forms of registering devices, and the term "disks" used throughout the claims is intended to cover such other common forms of registering mechanism as the equivalents of that shown and described.

I am aware of the application of Charles A. Neuert for improvement in fare-registers, filed July 5, 1890, Serial No. 357,735, and I do not claim any subject-matter shown or described therein.

What I claim is—

1. The combination, with a trip-register, of a removable general register having its disks locked against movement when the register is removed from the machine, substantially as described.

2. The combination, with a trip-register, of a removable general register having its disks locked against backward movement when the register is removed from the machine, and provided with a zero-stop, substantially as described.

3. The combination, with a trip-register, of a removable general register and locking devices locking the general register against removal, said locking devices being positively held against being unlocked when the trip-register is at any other point than zero, substantially as described.

4. The combination, with a trip-register, of a removable general register and a stop positively held in position to lock the general register against removal when the trip-register is at any other point than zero, substantially as described.

5. The combination, with a trip-register, of a removable general register and a stop positively held in position to lock the machine against the introduction of the general register when the trip-register is at any other point than zero, substantially as described.

6. The combination, with a trip-register, of a removable general register, a stop preventing the introduction or removal of the general register, and a stop-actuating cam moving with the trip-register and provided with a recess registering with the zero-point of the trip-register, into which the stop is withdrawn to permit the removal or introduction of the general register when the trip-register is at zero, substantially as described.

7. The combination, with a trip-register, of a removable general register and means whereby the removal of the general register locks the trip-register against registering movement, substantially as described.

8. The combination, with a trip-register, of a removable general register and means whereby the removal of the general register locks the trip-register against registering movement and the introduction of the general register unlocks the trip-register, substantially as described.

9. The combination, with a removable general register, of a trip-register coacting with the general register and means whereby the trip-register is locked against registering movement when the general register is removed, substantially as described.

10. The combination, with a removable general register, of a trip-register coacting with the general register, a prime mover actuating both registers, and means whereby the prime mover is locked against movement when the general register is removed, substantially as described.

11. The combination, with a trip-register, of a removable general register and means whereby the removal of the general register locks the general-register disks, substantially as described.

12. The combination, with a trip-register, of a removable general register and means whereby the removal of the general register locks the general-register disks and the introduction of the general register unlocks the general-register disks, substantially as described.

13. The combination, with a prime mover and trip-register, of a removable general register, operating connections between the prime mover and general register, and means whereby the removal of the general register disconnects the prime mover and general register and locks the trip-register and the general-register disks against movement and the introduction of the general register reconnects the prime mover and general register and unlocks the trip-register and the general-register disks, substantially as described.

14. The combination, with a prime mover and trip-register, of a removable general register, operating connections between the prime mover and general register, said connections being constructed to be broken and closed at will, and means whereby the removal of the general register locks the connections in their broken position and the introduction of the general register unlocks the connections and permits the prime mover and general register to be reconnected, substantially as described.

15. The combination, with a prime mover and trip-register, of a removable general register, operating connections between the prime mover and general register, means for controlling the connections between the prime mover and general register, and means whereby the removal of the general register locks the connection-controlling means against movement and the introduction of the general register unlocks the connection-controlling means, substantially as described.

16. The combination, with a prime mover and trip-register, of a general register, operating connections between the prime mover and general register, means for disconnecting the prime mover and general register for the return of the trip-register to zero, and a stop operating to prevent the reconnection of the prime mover and general register until the trip-register is returned to zero, substantially as described.

17. The combination, with a prime mover and trip-register, of a general register, operating connections between the prime mover and general register, a movable key controlling said connections, and means whereby the movement of the key to break said connections locks the key against movement to close the connections until the trip-register is returned to zero, substantially as described.

18. The combination, with a prime mover and trip-register, of a general register, operating connections between the prime mover and general register, a movable key controlling said connections, and a stop actuated by the movement of the key to break said connections and operating to prevent the reclosing of the connections until the trip-register is returned to zero, substantially as described.

19. The combination, with a prime mover and trip-register, of a general register, operating connections between the prime mover and general register, and means for simultaneously breaking said connections and locking the trip-register against registering movement, substantially as described.

20. The combination, with a prime mover and trip-register, of a general register, operating connections between the prime mover and general register, and means for simultaneously breaking said connections, locking the trip-register, and locking the general register disks, substantially as described.

21. The combination, with a prime mover and trip-register, of a general register, operating connections between the prime mover and general register, and means for simultaneously breaking said connections, locking the trip-register, and throwing the registering mechanism of the trip-register out of operation, substantially as described.

22. The combination, with a prime mover and trip-register, of a general register, operating connections between the prime mover and general register, and means for simultaneously breaking said connections and throwing the registering mechanism of the trip-register out of operation, substantially as described.

23. The combination, with a prime mover and trip-register, of a general register, operating connections between the prime mover and general register, one or more zero-stops, and means for simultaneously breaking said connections, throwing the registering mechanism of the trip-register out of operation for the return of the trip-register to zero, and adjusting the zero stop or stops for operation, substantially as described.

24. The combination, with a prime mover and trip-register, of a general register, operating connections between the prime mover and general register, mechanism for returning the trip-register to zero, and means for simultaneously breaking said connections, throwing the registering mechanism of the trip-register out of operation, and adjusting the trip-register-returning mechanism for operation, substantially as described.

25. The combination, with a prime mover and trip-register, of a removable general register, operating connections between the prime mover and general register, means for breaking and closing said connections, and means whereby the closing of said connections locks the general register against removal and the breaking of said connections unlocks the general register, substantially as described.

26. The combination, with a prime mover and trip-register, of a removable general register, operating connections between the prime mover and general register, means for breaking and closing said connections, and means whereby the closing of said connections locks the general register against removal and unlocks the general-register disks and the breaking of said connections unlocks the general register and locks the general-register disks, substantially as described.

27. The combination, with a prime mover and a trip-register, of a removable general register, operating connections between the prime mover and general register, a movable key controlling said connections, and means whereby one movement of the key closes the connections and locks the general register against removal and another movement of the key breaks the connections and unlocks the general register, substantially as described.

28. The combination, with a prime mover and trip-register, of a removable general register, operating connections between the prime mover and general register, a movable key controlling said connections, and means whereby one movement of the key closes the connections, locks the general register against removal, and unlocks the general-register disks, and another movement of the key breaks the connections, unlocks the general register, and locks the general-register disks, substantially as described.

29. The combination, with a prime mover and trip-register, of a removable general register, operating connections between the prime mover and general register, a movable key controlling said connections, and means whereby one movement of the key closes the connections, locks the general register against removal, and unlocks the prime mover, and another movement of the key breaks the connections, unlocks the general register, and locks the prime mover, substantially as described.

30. The combination, with a prime mover and trip-register, of a removable general register, operating connections between the prime mover and general register, a movable key controlling said connections, and means whereby one movement of the key closes the connections, locks the general register against removal, and unlocks the prime mover and general-register disks, and another movement of the key breaks the connections, unlocks the general register, and locks the prime mover and general-register disks, substantially as described.

31. The combination, with a prime mover and trip-register, of a general register, operating connections between the prime mover and general register, a movable key controlling said connections, and means whereby one movement of the key breaks the connections between the prime mover and general register and locks the prime mover and trip-register, and another movement of the key returns the parts to their normal positions, substantially as described.

32. The combination, with a prime mover and trip-register, of a general register, operating connections between the prime mover and general register, a movable key controlling said connections, and means whereby one movement of the key breaks the connections between the prime mover and general register and locks the general-register disks against movement, and another movement of the key returns the parts to their normal positions, substantially as described.

33. The combination, with a prime mover and trip-register, of a general register, operating connections between the prime mover and general register, a movable key controlling said connections, and means whereby one movement of the key breaks the connections between the prime mover and general register and locks the prime mover and general-register disks against movement, and another movement of the key returns the parts to their normal positions, substantially as described.

34. The combination, with a prime mover and trip-register, of a general register, operating connections between the prime mover and general register, a movable key controlling said connections, and means whereby one movement of the key breaks the connections between the prime mover and general register, locks the prime mover, and throws the registering mechanism of the trip-register out of operation for the return of the trip-register to zero, and another movement of the key returns the parts to their normal positions, substantially as described.

35. The combination, with a prime mover and trip-register, of a general register, operating connections between the prime mover and general register, a movable key controlling said connections, one or more zero-stops, and means whereby one movement of the key breaks the connections between the prime mover and general register, throws the registering mechanism of the trip-register out of operation, and adjusts the zero stop or stops in position for operation to stop the trip-register at zero, and another movement of the key returns the parts to their normal positions, substantially as described.

36. The combination, with a prime mover and trip-register, of a general register, operating connections between the prime mover and general register, a movable key controlling said connections, means for returning the trip-register to zero, and means whereby one movement of the key breaks the connections between the prime mover and general register, locks the prime mover, and unlocks the trip-register-returning mechanism for the return of the trip-register to zero, and another movement of the key returns the parts to their normal positions, substantially as described.

37. The combination, with a prime mover and trip-register, of a general register, operating connections between the prime mover and general register, a movable key controlling said connections, means for returning the trip-register to zero, and means whereby one movement of the key breaks the connections between the prime mover and general register, locks the prime mover and general-register disks against movement, throws the registering mechanism of the trip-register out of operation, and unlocks the trip-register-returning mechanism, and another movement of the key returns the parts to their normal positions, substantially as described.

38. The combination, with a prime mover, of a general register, operating connections between the prime mover and general register constructed to be broken and closed, and a trip-register operated by the prime mover and inoperative when the connections between the general register and prime mover are broken, substantially as described.

39. The combination, with a prime mover and trip-register, of a general register, operating connections between the prime mover and general register, constructed to be broken and closed, and means for rendering the trip-register inoperative and locking the general-register disks when the connections between the general register and prime mover are broken, substantially as described.

40. The combination, with a prime mover and trip-register, of a removable general register and means whereby the removal of the general register renders the trip-register inoperative and locks the general-register disks, substantially as described.

41. The combination, with a prime mover and trip-register, of a removable general register and means whereby the removal of the general register renders the trip-register inoperative and locks the general-register disks, and the introduction of the general register renders the trip-register operative and unlocks the general-register disks, substantially as described.

42. The combination of two coacting registers, one of which is removable and the other locked against movement when the removable register is removed, substantially as described.

43. The combination of coacting trip and general registers, one of which is removable and the other locked against movement when the removable register is removed, substantially as described.

44. The combination, with a removable general register, of a trip-register coacting with the general register and locked against registering movement when the general register is removed, substantially as described.

45. The combination, with a permanent register, of a removable register coacting with the permanent register and having its disks locked against movement when the register is removed, substantially as described.

46. The combination of two coacting registers, one of which is removable, and locking devices actuated by a registering movement of the permanent register to lock the removable register against removal, said locking devices being positively held against being unlocked, except when the permanent register is in a certain position, substantially as described.

47. The combination of two coacting registers, one of which is removable, and a stop positively held in position to lock the machine against the introduction of the removable register, except when the permanent register is in a certain position, substantially as described.

48. In a registering-machine, a removable register provided with a zero-stop and having its registering-disks locked against backward movement when the register is removed from the machine, substantially as described.

49. In a registering-machine, a removable register provided with a zero-stop, and locking devices automatically locking the disks against backward movement when the register is removed from the machine, said locking devices being constructed to be unlocked to permit backward movement while the register is removed, substantially as described.

50. In a registering-machine, a removable register having its registering-disks locked against movement when the register is removed from the machine, substantially as described.

51. In a registering-machine, the combination of a removable register and means whereby the removal of the register from the machine locks the register-disks against movement, substantially as described.

52. The combination, with a prime mover, of a removable register, and means whereby the removal of the register locks the register-disks and the introduction of the register unlocks the register-disks, substantially as described.

53. The combination of a prime mover, a register operated thereby, means for disconnecting the prime mover and register, and means for locking the register-disks when disconnected from the prime mover, substantially as described.

54. The combination of a prime mover, a register, operating connections between the prime mover and register, and means for simultaneously breaking said connections and locking the register-disks, substantially as described.

55. The combination of a prime mover, a register, operating connections between the prime mover and register, and means whereby the register-disks are locked and unlocked, respectively, by the breaking and closing of said connections, substantially as described.

56. The combination of a prime mover, a removable register, operating connections between the prime mover and register, and means whereby the register is locked against removal and unlocked, respectively, by the closing and breaking of said connections, substantially as described.

57. The combination of a prime mover, a removable register, operating connections between the prime mover and register, and means whereby the register is locked against removal and the register-disks unlocked by the closing of said connections and the register unlocked and register-disks locked by the breaking of said connections, substantially as described.

58. The combination of a prime mover, a register, operating connections between the prime mover and register, a movable key controlling said connections, and means whereby one movement of the key breaks the connections and locks the register-disks and another movement of the key closes the connections and unlocks the register-disks, substantially as described.

59. The combination of a prime mover, a register, operating connections between the prime mover and register, a rotating and sliding key forming a part of said connections, and means whereby the sliding movement of the key in one direction breaks the connections between the key and register and locks the register-disks and the movement of the key in the opposite direction closes the connections and unlocks the register-disks, substantially as described.

60. The combination of a prime mover, a register, operating connections between the prime mover and register, a rotating and sliding key forming a part of said connections, and means whereby the sliding movement of the key in one direction breaks the connections between the key and register-disks and prime mover and the movement of the key in the opposite direction closes the connections, substantially as described.

61. The combination of a prime mover, a register, operating connections between the prime mover and register, a rotating and sliding key forming a part of said connections, and means whereby the sliding movement of the key in one direction breaks the connections between the key and register-disks and between the key and prime mover and the movement of the key in the opposite direction reconnects parts, substantially as described.

62. The combination of a prime mover, a register, a key entering the register and completing the connections between the prime mover and register, and means whereby the register-disks are locked against movement or unlocked according as the connections are broken or complete, substantially as described.

63. The combination of a prime mover, a removable register, operating connections between the prime mover and register, a movable key controlling said connections and withdrawn from the register to break the connections, and means whereby the removal of the register locks the key in its withdrawn position and the introduction of the register unlocks the key, substantially as described.

64. The combination of a prime mover, a removable register, a movable key entering the register in the normal operative position of the parts and withdrawn when the register is inoperative, and means whereby the removal of the register locks the key in its withdrawn position and the introduction of the register unlocks the key, substantially as described.

65. The combination of a prime mover, a register, operating connections between the prime mover and register, constructed to be broken and closed, and means whereby the prime mover is locked against movement when the connections between the register and prime mover are broken, substantially as described.

66. The combination of a prime mover, a register, operating connections between the prime mover and register, constructed to be broken and closed, and means whereby the prime mover and general-register disks are locked against movement when the connections between the register and prime mover are broken, substantially as described.

67. The combination, with a prime mover, of a removable register and means whereby the prime mover is locked against movement when the register is removed, substantially as described.

68. The combination, with a prime mover, of a removable register and means whereby the removal of the register locks the prime mover against movement and the introduction of the register unlocks the prime mover, substantially as described.

69. The combination, with a prime mover, of a removable register, operating connections between the prime mover and the register, and means whereby the removal of the register locks the prime mover and register-disks against movement and the introduction of the general register unlocks the prime mover and register-disks, substantially as described.

70. The combination, with a prime mover, of a removable register, operating connections between the prime mover and register, constructed to be broken and closed, and means whereby the removal of the general register locks the connections in their broken position and the introduction of the general register unlocks the connections and permits the prime mover and register to be reconnected, substantially as described.

71. The combination, with a prime mover, of a removable register, operating connections between the prime mover and register, means for controlling the connections between the prime mover and register, and means whereby the removal of the register locks the controlling means against movement and the introduction of the register unlocks the controlling means, substantially as described.

72. The combination, with a prime mover, of a register, operating connections between the prime mover and register, and means for simultaneously breaking said connections and locking the prime mover against movement, substantially as described.

73. The combination, with a prime mover, of a register, operating connections between the prime mover and register, and means for simultaneously breaking said connections and locking the prime mover and general-register disks against movement, substantially as described.

74. The combination, with a prime mover, of a removable register, operating connections between the prime mover and register, constructed to be broken and closed, and means whereby the closing of said connections locks the register against removal and the breaking of said connections unlocks the register and permits it to be removed, substantially as described.

75. The combination, with a prime mover, of a register, operating connections between the prime mover and register, a movable key controlling said connections, and means whereby one movement of the key closes the connections and locks the register against removal and another movement of the key breaks the connections and unlocks the register, substantially as described.

76. The combination, with a prime mover, of a removable register, operating connections between the prime mover and register, a movable key controlling said connections, and means whereby one movement of the key closes the connections, locks the register against removal, and unlocks the register-disks, and another movement of the key breaks the connections, unlocks the register, and locks the register-disks, substantially as described.

77. The combination, with a prime mover, of a register, operating connections between the prime mover and register, a movable key controlling said connections, and means whereby one movement of the key breaks the connections between the prime mover and register and locks the prime mover, and another movement of the key returns the parts to their normal positions, substantially as described.

78. The combination, with a prime mover, of a register, operating connections between the prime mover and register, a movable key controlling said connections, and means whereby one movement of the key breaks the connections between the prime mover and register and locks the prime mover and register-disks against movement, and another movement of the key returns the parts to their normal positions, substantially as described.

79. In a registering-machine, the combination of a register removable from the machine and provided with a key-hole, a guard for covering said key-hole, and means operating automatically to lock said guard in position to cover said key-hole and unlock the same, substantially as described.

80. In a registering-machine, the combination of a removable register provided with a key-hole, a guard for covering said key-hole, and means whereby the guard is automatically moved into and locked in position to cover said key-hole on the removal of the register and withdrawn to uncover said key-hole when the register is returned to position, substantially as described.

81. In a registering-machine, the combination of a removable register provided with a key-hole, a guard for covering said key-hole, and means whereby the guard is automatically moved into and locked in position to cover said key-hole on the removal of the register, substantially as described.

82. The combination of a prime mover, a removable register, a movable key controlling the connections between the prime mover and register, a door through which the register is removed, and connections whereby the opening of the door locks the key against movement until the door is closed, substantially as described.

83. The combination of a prime mover, a removable register, a movable key controlling the connections between the prime mover and register, a door through which the register is removed, and means whereby the movement of the key to close the connections between the prime mover and register locks the door, substantially as described.

84. The combination of a prime mover, a removable register, a movable key controlling the connections between the prime mover and register, a door through which the register is removed, and connections whereby the opening and closing of the door respectively locks and unlocks the key, and the movement of the key for completing and breaking the connections respectively locks and unlocks the door, substantially as described.

85. The combination, with a prime mover and trip-register, of a general register, normally-locked operating connections between the prime mover and general register, a shaft for returning the trip-register to zero, and means whereby the rotation of the shaft into position for returning the trip-register unlocks the connections between the prime mover and general register and permits them to be broken, substantially as described.

86. The combination, with a prime mover and trip-register, of a removable general register, normally-locked connections between the prime mover and general register, a shaft for returning the trip-register to zero, and means whereby the rotation of the shaft into position for returning the trip-register unlocks the connections between the prime mover and general register and permits them to be broken and locks the general register against removal until the trip-register is returned to zero, substantially as described.

87. The combination, with a trip-register, of a removable general register, a shaft for returning the trip-register to zero, and means whereby the rotation of the shaft into position for returning the trip-register locks the general register against removal until the trip-register is returned to zero, substantially as described.

88. The combination, with a series of register-disks, of a zero-returning shaft on which the disks are loosely mounted, and pawls on one of the members engaging the other when the shaft is turned in the direction of registering movement of the disks, whereby a single rotation of the shaft in one direction positions it for the actuation of all the disks and the return of the shaft returns the disks to zero in the direction of their registering movement, substantially as described.

89. The combination, with a prime mover and series of register-disks, of a notched shaft on which the register-disks are loosely mounted, pawls carried by said disks and adapted to be engaged by said shaft on its rotation in one direction for returning the register-disks to zero, one or more zero-stops, and means for throwing the register-gears out of operation and adjusting the zero-stops for operation to stop the register-disks at zero, substantially as described.

90. The combination, with a series of register-disks, of a removable outer casing provided with an interior recess or opening, a shaft connected to the register-disks and provided with a recess inside the casing, and a locking-pin 138, passing through the frame of the register and registering with both recesses in one position of the shaft, substantially as described.

91. The combination, with a removable register L, having key-hole 75, of the notched guard-plate 132, having opening 133, registering with the key-hole in one position of the guard-plate, tumblers holding the guard-plate in position to cover said key-hole, keys 5 for releasing said tumblers, a spring for moving the guard-plate in one direction, and a fixed incline on the registering-machine moving the guard-plate in the opposite direction against the tension of the spring as the register is removed from the machine, substantially as described.

92. The combination, with a removable register having a key-hole, of a spring-pressed plate withdrawn to uncover said key-hole when the register is in the machine, and an incline on the machine moving said guard-plate into position to cover the key-hole as the register is removed, substantially as described.

93. The combination, with the register L, provided with recesses 102 of varying depths, of the gear 93 and the spring-pressed locking-pins 99 101, co-operating with the recesses, substantially as described.

94. The combination, with the register-disks M, of the casing 64, screw-threaded head 66, pin 138, adapted to pass through openings in the casing and head, and block 74, having recess 175 registering with the pin and openings in one position of the disks, substantially as described.

95. The combination, with the register-disks M, casing 64, and removable head 66, of the shaft 72, carrying the registering mechanism, said shaft being made removable to withdraw the registering mechanism from the casing, and means for locking the removable head 66 against removal, substantially as described.

96. The combination, with the removable register L, of the key 92, slide 105, moving with said key, and door P, having locking-arm 125, co-operating with said slide, substantially as described.

97. The combination, with the removable register L, having the notch 128, of the key 92, slide 105, moving with said key and having the notch 131, and spring-pressed rocking arm 126, having the stop 127 and forked stop 130, substantially as described.

98. The combination, with the register-disk M and means for driving the same, of a plurality of series of spring-pressed locking-pins 77, key 92, and a series of unlocking-pins 76, engaged by the key and engaging different series of locking-pins in accordance with the position of the disk, substantially as described.

99. The combination, with the register-disk M and means for driving the same, of a series of spring-pressed locking-pins 77 for each number of the disk, a key 92, and a series of unlocking-pins 76, engaged by the key and engaging different series of locking-pins in accordance with the position of the disk, substantially as described.

100. The combination, with disk 89, of key 92, rotating and sliding therein, and plate 174, rotating with the key and having key-hole 175, substantially as described.

101. The combination, with the register L and means for operating the same, of the key 92, entering said register in the normal operative position of the parts and withdrawn when the register is inoperative, and plate 174, having key-hole 175, and behind which the key is concealed when withdrawn, substantially as described.

102. The combination, with a prime mover, of a register, operating connections between the prime mover and register, constructed to be broken and closed, and an alarm operated with the register and inoperative when the connections between the prime mover and register are broken, substantially as described.

103. In a registering-machine, the combination of a removable register, a bell and bell-hammer operated with the register, and means whereby the bell-hammer is locked against movement when the register is removed from the machine, substantially as described.

104. The combination, with a trip-register, of a general register, means for disconnecting the general register for the return of the trip-register to zero, an alarm mechanism, and means whereby the disconnection of the general register throws the alarm mechanism out of operation, substantially as described.

105. The combination, with the register K, bell F, bell-shaft 56, and connections whereby the registering movement of the register rocks the shaft and rings the bell, of an arm 63 on the bell-shaft, and slide 106, carrying cam 111, engaging said arm, whereby the movement of the cam rocks the shaft and carries the bell-operating mechanism into inoperative position, substantially as described.

106. The combination, with the prime mover S and register L, of the key 92, controlling the connections between the prime mover and register, slides 105 106, moving with said key, and stop 110, carried by slide 106 and locking said prime mover when the connections are broken, substantially as described.

107. The combination, with the register-disks K and gears connecting the disks of the series, of one or more movable gear-supports 31, and slide 106, having one or more cams 112 engaging said supports, substantially as described.

108. The combination, with the register-disks K and gears connecting the disks of the series, of one or more movable spring-pressed gear-supports 31, and slide 106, having one or more cams 112 moving said supports against the tension of the springs, substantially as described.

109. The combination, with the register-disks K and gears connecting the disks of the series, of one or more movable gear-supports and movable cams moving said supports to carry the gears into operative position, substantially as described.

110. The combination, with the register-disks K and gears connecting the disks of the series, of one or more movable gear-supports 31, provided with zero-stops 35, and means for moving the supports to carry the gears and zero-stops in and out of operative position, substantially as described.

111. The combination, with the register-disks K, provided with zero-stops 26, and gears connecting the disks of the series, of one or more movable gear-supports 31, provided with zero-stops 35, and means for moving the supports to carry the gears and zero-stops in and out of operative position, substantially as described.

112. The combination, with the register-disks K and gears connecting the disks of the series, of the notched shaft 10, on which the disks are loosely mounted, spring-pressed pawls 27, engaged by the shaft for the return of the register-disks to zero, and movable supports carrying the register-gears, whereby the latter may be thrown out of operative position, substantially as described.

113. The combination, with the register-disks K and gears connecting the disks of the series, of the notched shaft 10, on which the disks are loosely mounted, zero-stops, spring-pressed pawls 27, engaged by the shaft for the return of the register-disks to zero, and movable supports 31, carrying the register-gears and zero-stops, substantially as described.

114. The combination, with the trip-register and shaft 10 for returning the trip-register to zero, of the removable general register, spring-pressed locking-pin 117, and disk 14, carried by shaft 10 and provided with a notch 116, registering with the pin in the position of the shaft corresponding to the zero-point of the register, substantially as described.

115. The combination, with the shaft 10, of disk 13, carried thereby, spring-pressed sliding plate 114, having reversely-beveled surfaces $a\ b$, and reciprocating slide 106, carrying stop 113, adapted to engage said disk and plate, substantially as described.

116. The combination, with the trip-register, shaft 10 for returning the trip-register to zero, disk 13, carried by said shaft, and spring-pressed plate 114, sliding transversely of said shaft and having reversely-beveled surfaces $a\ b$, of a general register, means for disconnecting the trip and general registers, and reciprocating slide 106, carrying stop 113, adapted to engage said disk and plate and moved past said disk by the movement of connecting or disconnecting the registers, whereby the latter can be connected or disconnected only when the stop is opposite one of the beveled surfaces $a\ b$, substantially as described.

117. The combination, with casing 64, of the removable head 66, fixed head 65, having slot 7 inside the casing, shaft 72, carrying the registering mechanism and supported in said head 65 to permit it to be withdrawn when the head 66 is removed, and pin 8, passing through the shaft and slot 7, substantially as described.

In testimony whereof I have hereunto set my hand in the presence of two subscribing witnesses.

JAMES T. COWLEY.

Witnesses:
ALB. E. HUMPHREYS,
A. I. DAVIS.